(12) United States Patent
Kudo et al.

(10) Patent No.: US 9,259,646 B2
(45) Date of Patent: Feb. 16, 2016

(54) OBJECT CONTROL DEVICE, COMPUTER READABLE STORAGE MEDIUM STORING OBJECT CONTROL PROGRAM, AND OBJECT CONTROL METHOD

(75) Inventors: Masashi Kudo, Tokyo (JP); Fumito Ueda, Tokyo (JP); Keiichiro Ishihara, Tokyo (JP); Takahisa Suzuki, Tokyo (JP); Yui Sasajima, Tokyo (JP); Junichi Hosono, Tokyo (JP); Takeshi Nakagawa, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 789 days.

(21) Appl. No.: 13/609,888

(22) Filed: Sep. 11, 2012

(65) Prior Publication Data

US 2013/0064456 A1  Mar. 14, 2013

(30) Foreign Application Priority Data

Sep. 12, 2011 (JP) .................................. 2011-198874
Sep. 12, 2011 (JP) .................................. 2011-198875

(51) Int. Cl.
*A63F 13/40* (2014.01)
*G06K 9/46* (2006.01)

(52) U.S. Cl.
CPC .............. *A63F 13/10* (2013.01); *G06K 9/4604* (2013.01); *A63F 2300/6054* (2013.01); *A63F 2300/638* (2013.01); *A63F 2300/646* (2013.01)

(58) Field of Classification Search
None
See application file for complete search history.

(56) References Cited

U.S. PATENT DOCUMENTS

| | | | |
|---|---|---|---|
| 2005/0187015 A1* | 8/2005 | Suzuki et al. | 463/32 |
| 2007/0294384 A1* | 12/2007 | Nakajima et al. | 709/223 |
| 2008/0102951 A1* | 5/2008 | Eto et al. | 463/32 |
| 2010/0022304 A1* | 1/2010 | Katayama et al. | 463/31 |
| 2010/0041483 A1* | 2/2010 | Kobayashi | 463/43 |
| 2010/0113147 A1* | 5/2010 | Chosogabe et al. | 463/30 |

* cited by examiner

*Primary Examiner* — Maurice L McDowell, Jr.
(74) *Attorney, Agent, or Firm* — Katten Muchin Rosenman LLP

(57) ABSTRACT

An object control device includes an object of interest specifying unit configured to specify an object of interest to obtain position information on the object of interest, an obstacle determining unit configured to determine whether there is an obstacle between the object of interest and the object, and a time measuring unit configured to measure a period after determining that there is the obstacle, and a holding unit configured to hold position information of the object of interest when the period reaches a predetermined period, and an object action control unit configured to control a direction of a part of the object, based on the position information obtained by the object of interest specifying unit before the period reaches the predetermined period, and based on the position information on the object of interest held in the holding unit after the period reaches the predetermined period.

28 Claims, 20 Drawing Sheets

FIG. 5

| AVDID | ANGULAR INFORMATION | DIVIDING NUMBER INFORMATION | AP RADIUS INFORMATION | DIRECTION INFORMATION | AC DISTANCE INFORMATION |
|---|---|---|---|---|---|
| AVD1-1 | 60 | 3 | 20 | (x1,y1,z1) | 2 |
| AVD1-2 | 60 | 3 | 20 | (x2,y2,z2) | 2 |

| OBJECT OF INTEREST ID | PRIORITY ORDER INFORMATION | ACTION ID | AVDID |
|---|---|---|---|
| K1 | 1 | A1 | AVD1 |
|  | 2 | A2 | AVD2 |
|  | 3 | A3 | AVD3 |
|  |  |  |  |

OBJECT CONTROL DEVICE, COMPUTER READABLE STORAGE MEDIUM STORING OBJECT CONTROL PROGRAM, AND OBJECT CONTROL METHOD

CROSS-REFERENCE TO RELATED APPLICATION

The present application claims priority from Japanese Applications JP2011-198874 and JP2011-198875 which were filed Sep. 12, 2011. The content of these applications is hereby incorporated by reference into this application.

BACKGROUND OF THE INVENTION

1. Field of the Invention

The present invention relates to an object control device, a computer readable storage medium storing an object control program, and an object control method.

2. Description of the Related Art

There have been known games in which a character is moved to a predetermined destination and then caused to perform a predetermined action. For example, there is a game in which, in a virtual space, a character that is not operated by a player is moved to a position of a predetermined item and caused to catch the item.

In addition, there have been known game programs in which a character tracks an object of interest. Specifically, for example, in a virtual space, a character tracks an object of interest, and when having moved to the position of the object of interest, is caused to perform a predetermined action with respect to the object of interest.

SUMMARY OF THE INVENTION

In the former case, in order to express a more natural action, it may be desirable, depending on, e.g., the position of a part of the item to be grasped (e.g., a handle) and/or the kind of the item, to have the character moved to a destination in a predetermined direction relative to and away by a predetermined distance from the item before the character is caused to perform a predetermined action, such as catching the item or the like. In this case, for a character that occupies some space in the virtual space, for example, it is desirable that interference between the character and an obstacle is avoided when the character performs the predetermined action or the like. Moreover, the destination is desirably closer to the character.

In the latter case, when the character is a person, an animal, or the like, and moving toward the object of interest, it may be desired in some cases that the character is set moving to the object of interest while keeping the face or head thereof directed toward the object of interest. Further, when the object of interest has moved to behind a wall or the like in the virtual space, it may be desirable for expression of a more natural action in some cases that the position of the object of interest having moved to behind the wall or the like is estimated so that the character is set directed in the estimated direction.

One or more embodiments of the present invention has been conceived in view of the above, and aims to provide a computer readable storage medium storing an object control program, an object control device, an object control method capable of, for example, setting a destination as to an item, depending on the kind of the item, an action which a character is caused to perform with respect to the item, the position of an obstacle, or the like, then moving the character to the destination, and causing the character to perform the predetermined action.

Further, in view of the above, one or more embodiments of the present invention also aims to provide a computer readable storage medium storing an object control program, an object control device, an object control method capable of controlling such that a part, such as, e.g., the head or face or the like, of a structure constituting an object is directed to an object of interest in a virtual space, and also expressing a more natural action of the object even when the object of interest has moved to behind a wall or the like.

In one or more embodiments of the present invention, an object control device includes an object of interest specifying unit configured to specify an object of interest in a virtual space to obtain position information on the object of interest, an obstacle determining unit configured to determine whether or not there is an obstacle for an object between the object of interest and the object in the virtual space, a time measuring unit configured to measure a period of time elapsed after the obstacle determining unit determines that there is the obstacle, and a holding unit configured to hold position information indicating a position of the object of interest when the period of time measured by the time measuring unit reaches a predetermined period of time. The object control device also includes an object action control unit configured to control a direction of a part of the object based on the position information obtained by the object of interest specifying unit before the period of time measured reaches the predetermined period of time. Also, the object action control unit controls a direction of a part of the object and based on the position information on the object of interest held in the holding unit after the period of time measured reaches the predetermined period of time.

In one or more embodiments of the present invention, a computer readable storage medium storing an object control program for causing a computer to function as: an object of interest specifying unit configured to specify an object of interest in a virtual space to obtain position information on the object of interest; an obstacle determining unit configured to determine whether or not there is an obstacle for an object between the object of interest and the object in the virtual space; a time measuring unit configured to measure a period of time elapsed after the obstacle determining unit determines that there is the obstacle; a holding unit configured to hold position information indicating a position of the object of interest when the period of time measured by the time measuring unit reaches a predetermined period of time; and an object action control unit configured to control a direction of a part of the object, based on the position information obtained by the object of interest specifying unit before the period of time measured reaches the predetermined period of time, and based on the position information on the object of interest held in the holding unit after the period of time measured reaches the predetermined period of time.

In one or more embodiments of the present invention, An object control method includes specifying an object of interest in a virtual space to obtain position information on the object of interest; determining whether or not there is an obstacle for an object between the object of interest and the object in the virtual space; measuring a period of time elapsed after determination that there is the obstacle; holding position information indicating a position of the object of interest when the period of time measured reaches a predetermined period of time; and controlling a direction of a part of the object, based on the position information obtained before the period of time measured reaches the predetermined period of time, and based on the position information on the object of interest held after the period of time measured reaches the predetermined period of time.

In one or more embodiments of the present invention, an object control device includes an interest object specifying unit configured to specify one or more objects of interest in a virtual space to obtain position information on the one or more objects of interest; an obstacle determining unit configured to determine whether or not there is an obstacle for an object between the one or more respective objects of interest and the object in the virtual space; a time measuring unit configured to measure a period of time elapsed after the obstacle determining unit determines that there is the obstacle for the object between the one or more respective objects of interest and the object; and a holding unit configured to hold position information indicating a position of the object of interest and to delete, in a predetermined case, the position information held therein, when the period of time measured by the time measuring unit reaches a predetermined period of time.

In one or more embodiments of the present invention, a computer readable storage medium storing an object control program for causing a computer to function as: an object of interest specifying unit configured to specify one or more objects of interest in a virtual space to obtain position information on the one or more objects of interest; an obstacle determining unit configured to determine whether or not there is an obstacle for an object between the one or more respective objects of interest and the object in the virtual space; a time measuring unit configured to measure a period of time elapsed after the obstacle determining unit determines that there is the obstacle for the object between the one or more respective objects of interest and the object; and a holding unit configured to hold position information indicating a position of the object of interest and to delete, in a predetermined case, the position information held therein, when the period of time measured by the time measuring unit reaches a predetermined period of time.

In one or more embodiments of the present invention, An object control method includes specifying one or more objects of interest in a virtual space to obtain position information on the one or more objects of interest; determining whether or not there is an obstacle for an object between the one or more respective objects of interest and the object in the virtual space; measuring a period of time elapsed after determining that there is the obstacle for the object between the one or more respective objects of interest and the object; and holding position information indicating a position of the object of interest and deleting, in a predetermined case, the position information held in a holding unit, when the period of time measured reaches a predetermined period of time.

In one or more embodiments of the present invention, an object control device includes an object of interest specifying unit configured to specify an object of interest in a virtual space to obtain position information and identification information on the object of interest. The object control device also includes a destination candidate information storage unit configured to store destination candidate information for obtaining position information on destination candidates that are candidates for a destination for an object to move. The destination candidate information is correlated to the identification information on the object of interest. The object control device further includes a destination information obtaining unit configured to obtain the position information on the destination candidates as to the object of interest and to obtain destination information indicating position information on the designation from the position information on the destination candidates, based on the position information and the identification information obtained on the object of interest and the destination candidate information.

In one or more embodiments of the present invention, a computer readable storage medium storing an object control program for causing a computer to function as: an object of interest specifying unit configured to specify an object of interest in a virtual space to obtain position information and identification information on the object of interest; a destination candidate information storage unit configured to store destination candidate information for obtaining position information on destination candidates that are candidates for a destination for an object to move, wherein the destination candidate information is correlated to the identification information on the object of interest; and a destination information obtaining unit configured to obtain the position information on the destination candidates as to the object of interest and also destination information indicating position information on the designation from among the position information on the destination candidates, based on the position information and the identification information obtained on the object of interest and the destination candidate information.

In one or more embodiments of the present invention, an object control method includes specifying an object of interest in a virtual space and obtaining position information and identification information on the object of interest; and obtaining position information on destination candidates as to the object of interest and destination information indicating position information on a destination from among the position information on the destination candidates, based on the position information and the identification information obtained on the object of interest and destination candidate information. The destination candidate information for obtaining position information on destination candidates that are candidates for a destination for an object to move is stored so as to be correlated to the identification information on the object of interest.

BRIEF DESCRIPTION OF THE DRAWINGS

FIG. 5 is a diagram showing one example of a storage format of ADV information in this embodiment;

FIG. 5B is a diagram explaining one example of a nearest edge obtaining processing in this embodiment;

DETAILED DESCRIPTION OF THE INVENTION

Figure 1:
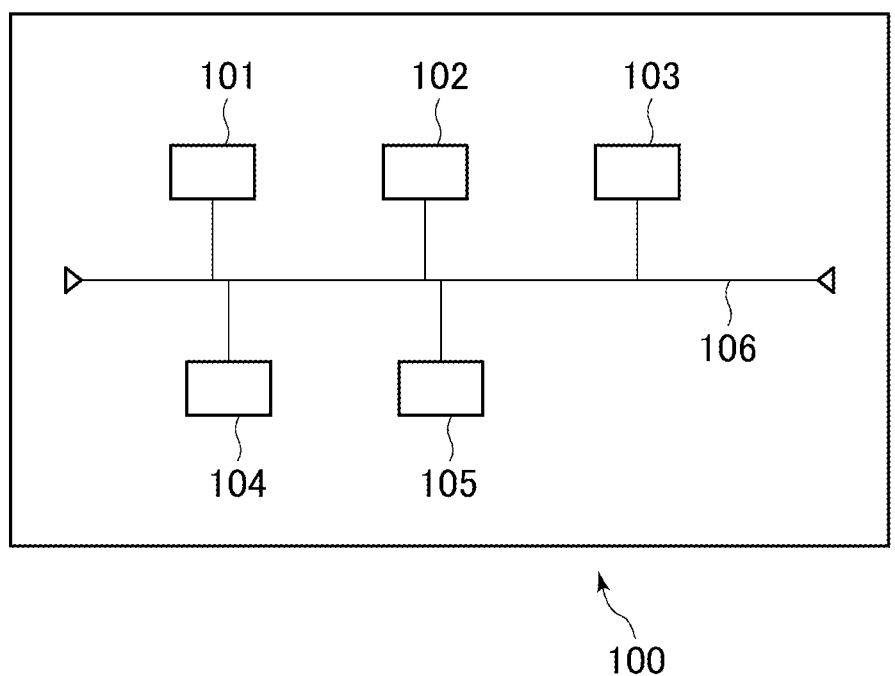
FIG. 1 is a diagram explaining an outline of a structure of an object control device according to an embodiment of the present invention.

In the following, an embodiment of the present invention will be described with reference to the following diagrams. In the diagrams, identical or equivalent elements are given an identical reference numeral and a duplicated description is not repeated.

FIG. 1 is a diagram explaining an outline of a structure of an object control device according to an embodiment of the present invention. As shown in FIG. 1, an object control device 100 includes, e.g., a computer including a CPU, a memory, and the like, and has, e.g., a control unit 101, a storage unit 102, a communication unit 103, an operating unit 104, and a display unit 105. Note that the control unit 101, the storage unit 102, the communication unit 103, the operating unit 104, and the display unit 105 are connected to one another via an internal bus 106.

The control unit 101 is, e.g., a CPU, an MPU, or the like, and operates according to a program stored in the storage unit 102. The storage unit 102 includes an information storage medium, such as, e.g., a ROM, a RAM, a hard disk, or the like, for storing a program to be executed by the control unit 101.

The storage unit 102 operates also as a work memory of the control unit 101. The program may be provided through download via a network (not shown) or by a variety of computer readable information storage media, such as a CD-ROM, a DVD-ROM, or the like.

The communication unit 103 connects the object control device 100 to another terminal device (not shown), a database (not shown), or the like, via a network (not shown). The operating unit 104 includes, e.g., a keyboard, a mouse, a controller, or the like, and outputs the content of an instruction operation by a user to the control unit 101 according to the instruction operation. The display unit 105 is, e.g., a liquid crystal display, an organic EL display, or the like, and shows information according to an instruction from the control unit 101. Note that the above described structure of the object control device 100 is a mere example and not limiting. For example, an instruction operation by a user may be input from the terminal device to the object control device 100 via a network.

Figure 2:
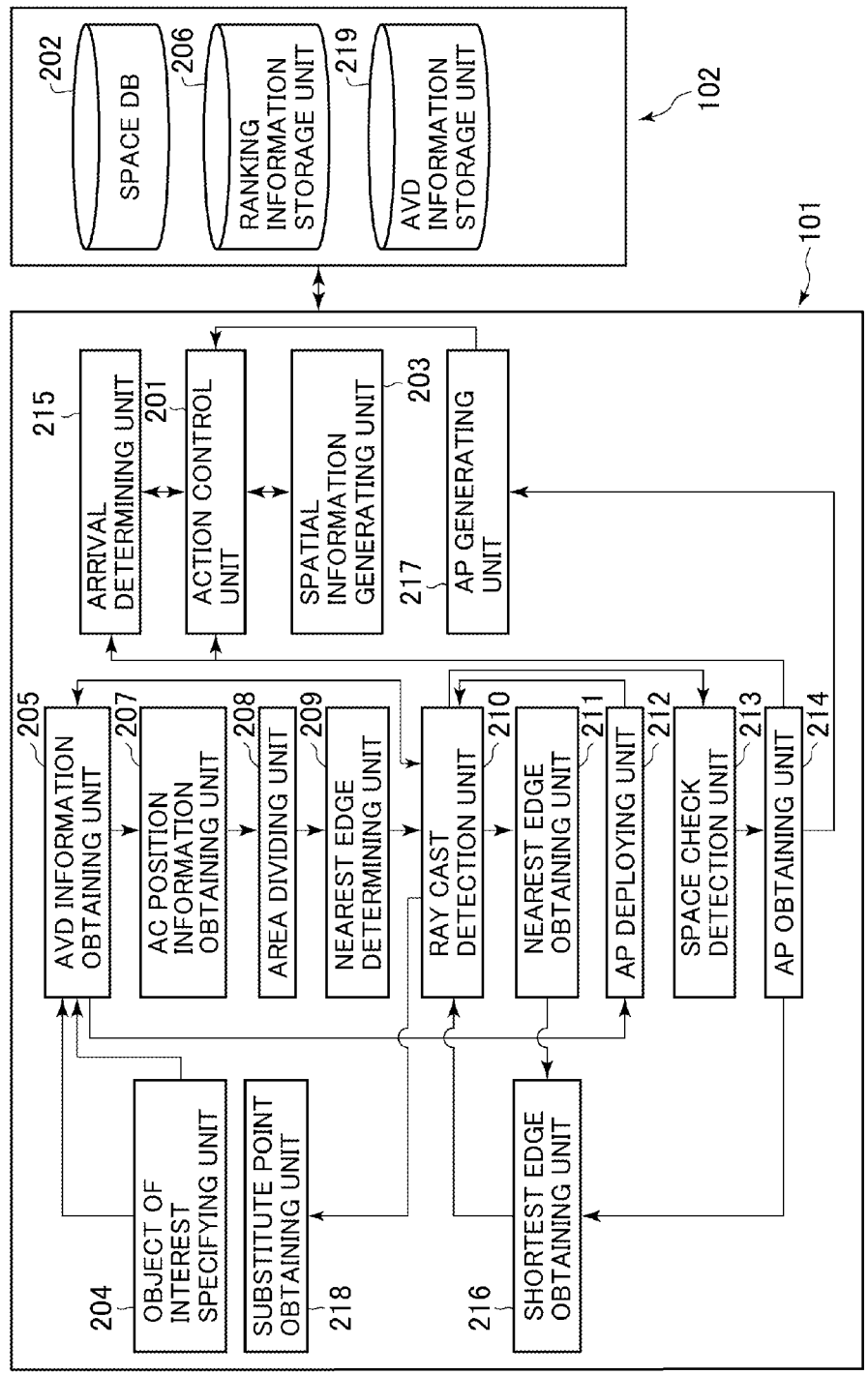
FIG. 2 is a diagram explaining a functional structure that is implemented in a control unit, a storage unit, and the like, of the object control device shown in FIG. 1.

FIG. 2 is a diagram explaining a functional structure that is implemented in the control unit and the storage unit of the object control device shown in FIG. 1. As shown in FIG. 2, the object control device 100 functionally includes an action control unit 201, a space DB 202, a spatial information generating unit 203, an object of interest specifying unit 204, an AVD information obtaining unit 205, a ranking information storage unit 206, an AC position information obtaining unit 207, an area dividing unit 208, a nearest edge determining unit 209, a ray cast detection unit 210, a nearest edge obtaining unit 211, an AP deploying unit 212, a space check detection unit 213, an AP obtaining unit 214, an arrival determining unit 215, a shortest edge obtaining unit 216, an AP generating unit 217, a substitute point obtaining unit 218, and an AVD information storage unit 219.

Figure 3:
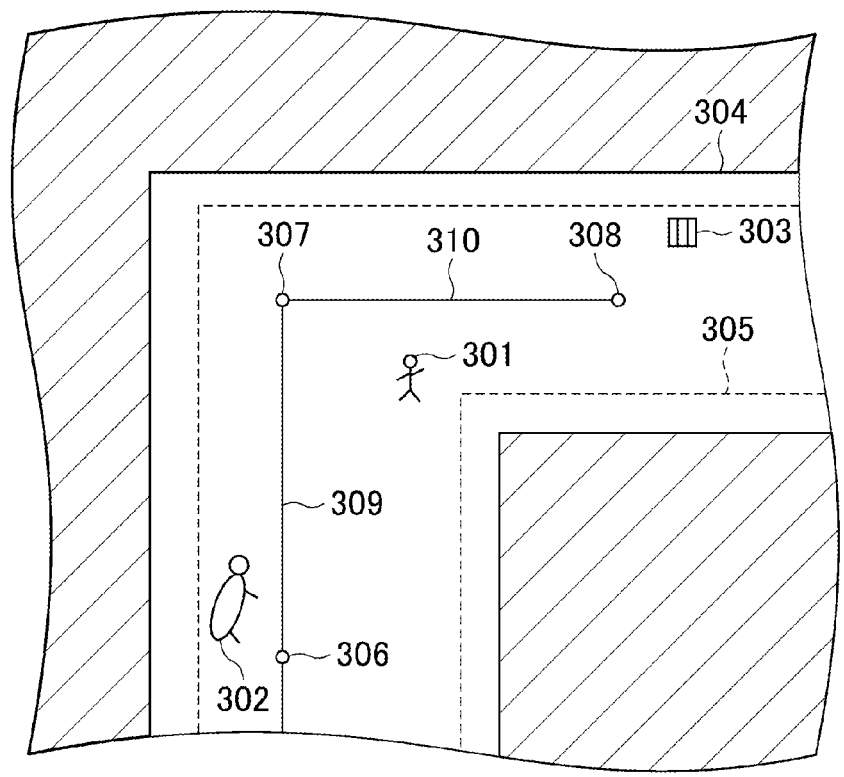
FIG. 3 is a diagram showing one example of a virtual space in this embodiment.

In the following, for brevity of description, it will be described that the virtual space shown in FIG. 3 is generated in the object control device 100 and a non-operating object is caused to move toward an object of interest as an example. FIG. 3 is a diagram showing one example of a virtual space. As shown in FIG. 3, an operating object 301, a non-operating object 302, an object of interest 303, a wall 304, a way collision 305, and the like, are shown in the virtual space. Note here that an operating object corresponds to, e.g., a character or the like that is operated by a user, and a non-operating object corresponds to, e.g., a character, such as an opponent character, that is not operated by a user. An object of interest corresponds to, e.g., an item which a character or an opponent character holds or uses. A wall and a way collision correspond to objects that are obstacles for an opponent character or the like, of which details are to be described later.

Figure 4:
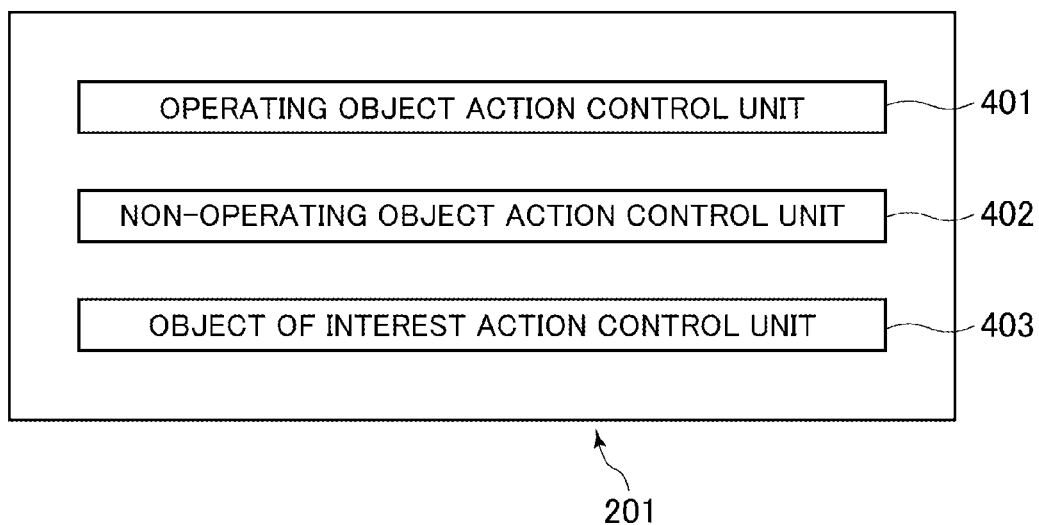
FIG. 4 is a diagram explaining a functional structure of an action control unit shown in FIG. 1.

In the virtual space, movements and actions of the operating object 301, the non-operating object 302, and the object of interest 303 are implemented by the action control unit 201. Specifically, as shown in FIG. 4, the action control unit 201 has an operating object action control unit 401, a non-operating object action control unit 402, and an object of interest action control unit 403.

The operating object action control unit 401 causes an operating object to move or perform an action according to operation information input to the operating unit 104.

The non-operating object action control unit 402 causes an object that is not operated by a user, that is, a non-operating object, to move or perform an action. Specifically, for example, in the case shown in FIG. 3, the non-operating object action control unit 402 moves the non-operating object 302 based on a path composed of nodes 306, 307, 308 and edges 309, 310 placed in the virtual space. That is, in moving the non-operating object 302 toward the object of interest 303, the non-operating object 302 is caused to move from the edge 309 to the edge 310. Note here that a so-called Bezier curve may be applied to, e.g., the respective both ends of an edge so that a non-operating object moves along the Bezier curve. The path is formed not shown in the virtual space that is actually shown on the display unit 105. Information on the positions of the nodes, the edges, and the like are held in, e.g., the space DB 202. Details on other movements and actions of a non-operating object will be described later.

The object of interest action control unit 403 displays and moves an object of interest in the virtual space. Specifically, while, for example, position information and image information on an object of interest is held in the space DB 202, the object of interest action control unit 403 displays the object of interest, based on the position information or the like.

The spatial information generating unit 203 generates image information expressing a virtual space. Specifically, as position information and image information on backgrounds, such as a wall or the like, an operating object, a non-operating object, and an object of interest in the virtual space are held in the space DB 202, the spatial information generating unit 203 generates image information expressing the virtual space, based on the position information and the image information on the wall or the like. Note that the position information on an operating object, a non-operating object, an object of interest, and so forth, stored in the space DB 202, is updated by, e.g., the action control unit 201 as the operating object moves and so forth. The image information may be shown on the display unit 105 or sent via a network to be shown on a display unit (not shown) of a terminal device connected to the network.

In addition, the spatial information generating unit 203 similarly generates a way collision or the like in the virtual space. Note here that a way collision corresponds to a wall or the like that is not actually shown, that is, not seen, but placed along a wall or the like that is shown in the virtual space shown with a predetermined distance away from the wall or the like. The non-operating object action control unit 402 regards, e.g., a way collision as an obstacle for a non-operating object, and does not let a non-operating object to move beyond the way collision toward the wall or the like. Further, position information or the like is determined in consideration of the size or the like of an object such that a way collision is placed away from a wall or the like by a predetermined distance. This makes it possible to prevent the non-operating object action control unit 402 from moving a non-operating object into, that is, so as to be buried in, a wall or the like.

In the following, a functional structure that is implemented in processing for obtaining nearest edge information, to be described later, under the above described premise will be mainly described.

The object of interest specifying unit 204 specifies an object of interest for a non-operating object according to a predetermined criterion, and obtains object of interest identification information (an object of interest ID) and position information on the object of interest. Specifically, specification of an object of interest may be made by specifying an object of interest that is located closest to a non-operating object in the virtual space, based on the position information on the non-operating object and on the object of interest, obtained from the action control unit 201 or the space DB 202, and then obtaining the object of interest ID and the position information on the object of interest.

For a non-operating object representative of an animal or the like, an object of interest located closer to the non-operating object among the objects of interest located in the view of field of the non-operating object may be specified. Further, point number information may be stored so as to be correlated to each object of interest, so that an object of interest may be specified based on the point number information or the point number information and a distance. Note that a case in which the object of interest specifying unit 204 specifies an object of interest 303 (object of interest identification information (object of interest ID) K1) in FIG. 3 will be described.

The AVD information obtaining unit 205 obtains AVD (Approach Volume Data) information stored so as to be correlated to the object of interest ID obtained by the object of interest specifying unit 204, based on the priority order information thereof. Specifically, when the nearest edge, to be described later, or a destination (AP: Approach Point) to which a non-operating object is moving cannot be obtained, AVD information having the immediately subsequent priority order is obtained.

Note here that AVD information corresponds to information indicating, as to a specified object of interest, a position that is a candidate (hereinafter referred to as an AP candidate) for a destination (hereinafter referred to as an AP) to which a non-operating object is moving. Specifically, as shown in FIG. 5, for example, each AVD information item includes an AVD ID, angle information, dividing number information, AP radius information, direction information, and AC distance information. The AVD information is stored in, e.g., the AVD information storage unit 219.

Figures 6, 7:
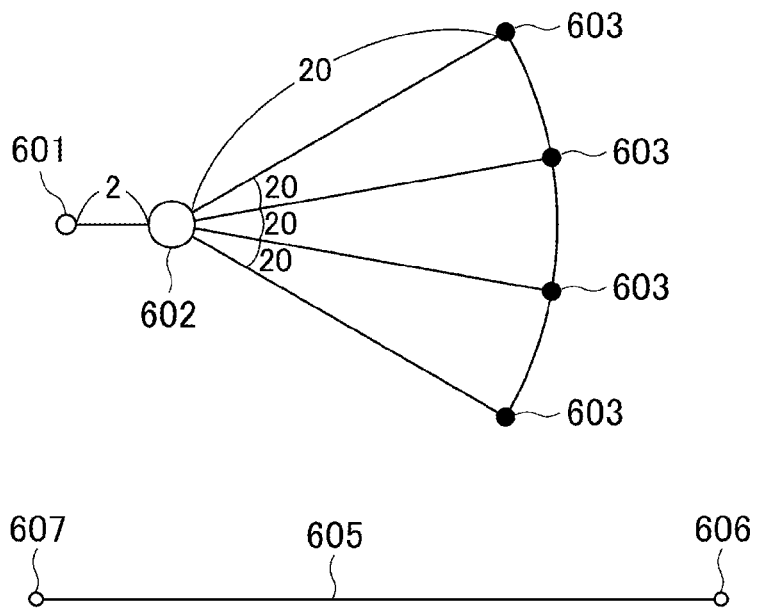
FIG. 6 is a diagram explaining one example of AVD information in this embodiment.
FIG. 7 is a diagram showing one example of a storage format of ranking information in this embodiment.

The AVD information will be described in the following, referring to AVD information having AVD ID 1-1, shown in FIG. 5, as an example. As shown in FIG. 6, an approach center (hereinafter referred to as an AC) 602 is defined at a position away from a position indicated by the position information on the object of interest 601, obtained by the object of interest specifying unit 204, by a distance indicated by the AC distance information, namely, 2 here, in a direction (x1, y1, z1) indicated by the direction information. Then, a fan shape having a radius indicated by the AP radius information, namely, 20 here, from the AC and an angle 60° with the direction indicated at the center is defined. Thereafter, the angle 60° is divided by the dividing number, namely, 3 here, so that AP candidates 603 are placed at respective positions resulting from the dividing. That is, the AVD information corresponds to information for obtaining the positions of AP candidates that are placed as to a specified object of interest. That is, the AC distance information corresponds to information indicating the distance between an object of interest and an AC. The AP radius information corresponds to information indicating a distance between an AC and an AP candidate. In this manner, positions of respective AP candidates are obtained.

Note that the method for determining AP candidates shown in FIG. 6 is a mere example, and not limiting. That is, a semi-circle or a circle with different angles, such as 180° or 360°, may be defined, and the positions of AP candidates may be obtained according to the dividing number. Moreover, any other method capable of defining AP candidates at positions in a predetermined direction relative to and away by a predetermined distance from an object of interest may be employed.

As shown in FIG. 7, for example, the ranking information storage unit 206 stores priority order information, an action ID, and an AVD ID so as to be correlated to each object of interest ID. Note here that the action ID is information that identifies an action, such as, e.g., to smell, to touch, to hit, to chew, and so forth, which a non-operating object is caused to perform. For example, motion data corresponding to each action is correlated to an action ID so that a non-operating object performs a predetermined action according to the motion data. The AVD information obtaining unit 205 obtains the AVD ID, beginning with one having the higher priority order information, as described above, and then obtains correlated AVD information from the AVD information storage unit 219, based on the AVD ID obtained. Each motion data may be different, depending on the angle information or the like.

Specifically, in a case shown in FIG. 7, when the object of interest ID K1 is obtained, as in the above described example, the AVD information obtaining unit 205 obtains the AVD ID AVD1, based on the object of interest ID K1, obtained by the object of interest specifying unit 204, and then obtains AVD information stored correlated to AVD1-1, based on the AVD ID AVD1.

Note that although FIG. 5 shows a case in which two AVD ID's (AVD1-1, AVD1-2) are stored with respect to AVD ID AVD1, this is not limiting, and any other number of AVD ID's may be stored. In addition, although it is described that an AVD ID is obtained from the ranking information storage unit 206 and that AVD information correlated via the AVD ID is obtained from the AVD information storage unit 219 in the above, the ranking information and correlated AVD information may be stored in a single storage, that is, e.g., in the ranking information storage unit 206 or the AVD information storage unit 219, so that the AVD information obtaining unit 205 can obtain correlated AVD information from the single storage unit, based on the object of interest ID.

The AC position information obtaining unit 207 calculates and thus obtains position information on an AC related to the AVD information obtained, based on the position information on the object of interest obtained by the object of interest specifying unit 204 and the AVD information obtained by the AVD information obtaining unit 205. Specifically, the AC position information obtaining unit 207 calculates and thus obtains AC position information related to the obtained AVD information, based on, e.g., the AC distance information and direction information stored correlated to the AVD ID AVD1-1 and the position information on the object of interest. Position information on an AC is calculated and thus obtained as described above referring to FIG. 6, for example.

Figure 8A:
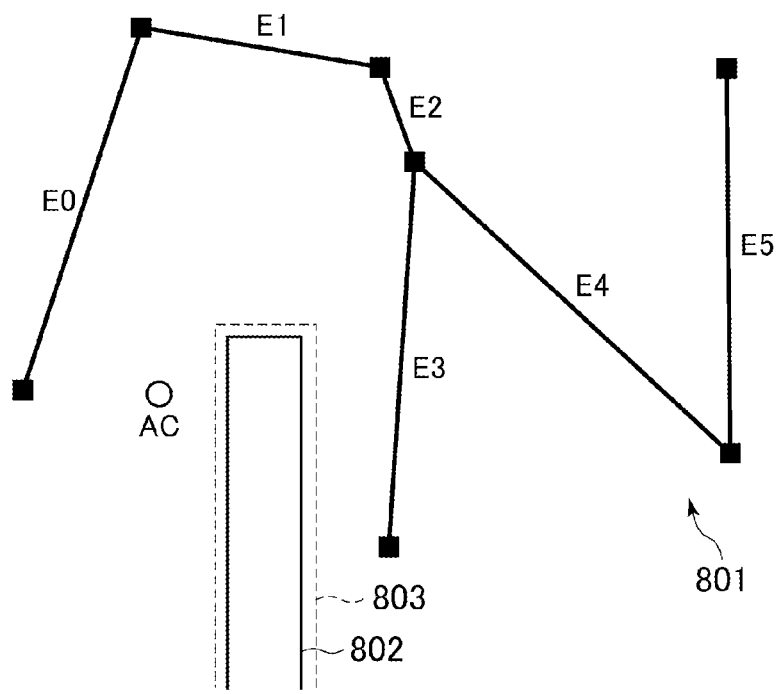
FIG. 8A is a diagram explaining one example of a nearest edge obtaining processing in this embodiment.

The area dividing unit 208 divides the virtual space into two or more areas, based on the position information on the AC, obtained by the AC position information obtaining unit 207. Specifically, a case in which an AC, a path 801, a wall 802, and a way collision 803 are placed, as shown in FIG. 8A, will be described as an example. The position information on an AC is obtained by the AC position information obtaining unit 207, and the position information on the path 801, the wall 802, and the way collision 803 is obtained from the space DB 202, as described above.

Figure 8B:
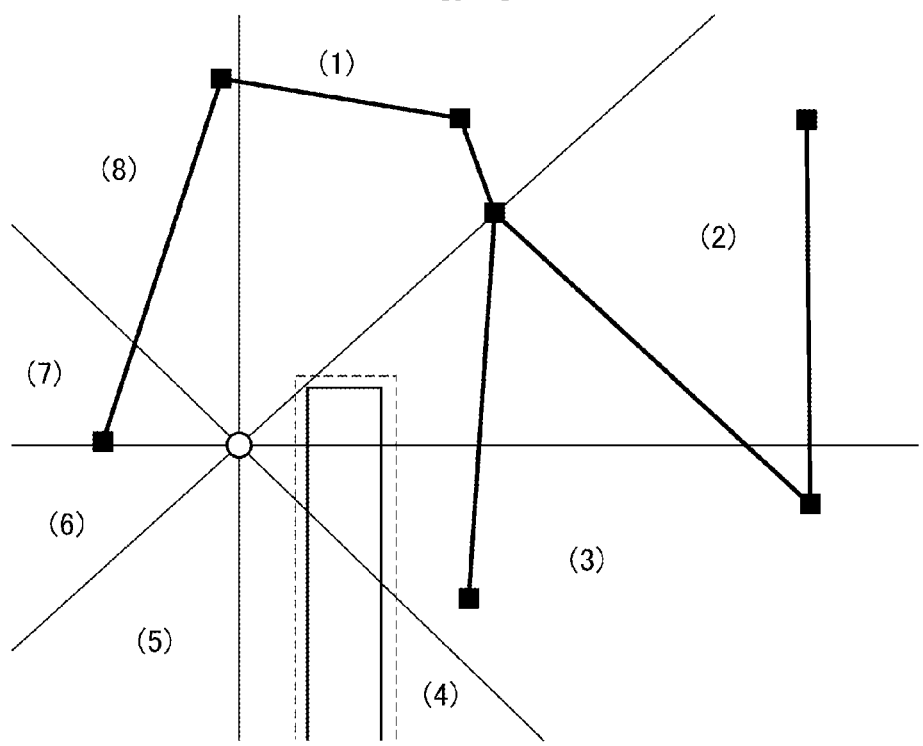
FIG. 8C is a diagram explaining one example of a nearest edge obtaining processing in this embodiment.
FIG. 8D is a diagram explaining one example of a nearest edge obtaining processing in this embodiment.
FIG. 8E is a diagram explaining one example of a nearest edge obtaining processing in this embodiment.
FIG. 8F is a diagram explaining one example of a nearest edge obtaining processing in this embodiment.
FIG. 8G is a diagram explaining one example of a nearest edge obtaining processing in this embodiment.
FIG. 8H is a diagram explaining one example of a nearest edge obtaining processing in this embodiment.
FIG. 8I is a diagram explaining one example of a nearest edge obtaining processing in this embodiment.

The area dividing unit 208 divides the virtual space radially into eight areas with the AC at the center, as shown in FIG. 8B. Note that the dividing number mentioned above is a mere example, and any other number is applicable.

The nearest edge determining unit 209 determines the nearest edge, that is, an edge having the shortest distance from the AC, for each area resulting from the dividing by the area dividing unit 208. Specifically, for example, the nearest edge determining unit 209 obtains position information on the respective edges from the space DB 202, and obtains the nearest point of each edge to the AC, based on the position information on the AC and that of the respective edges, to determine the nearest edge for each area in the virtual space resulting from the dividing by the area dividing unit 208.

Figure 8C:
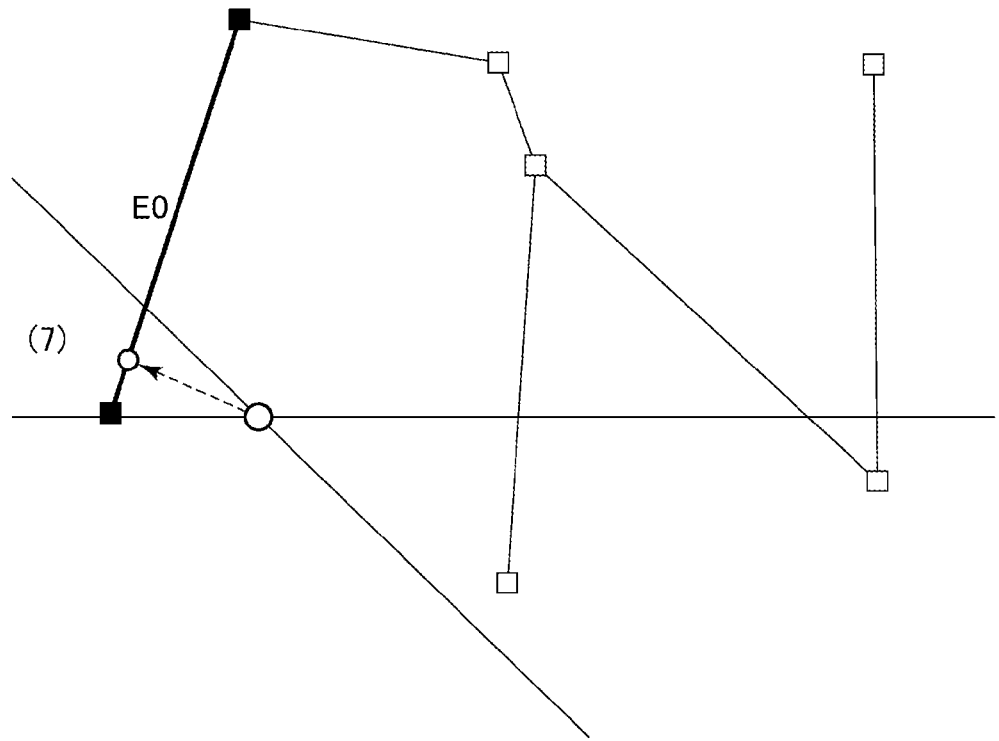
Figure 8D:
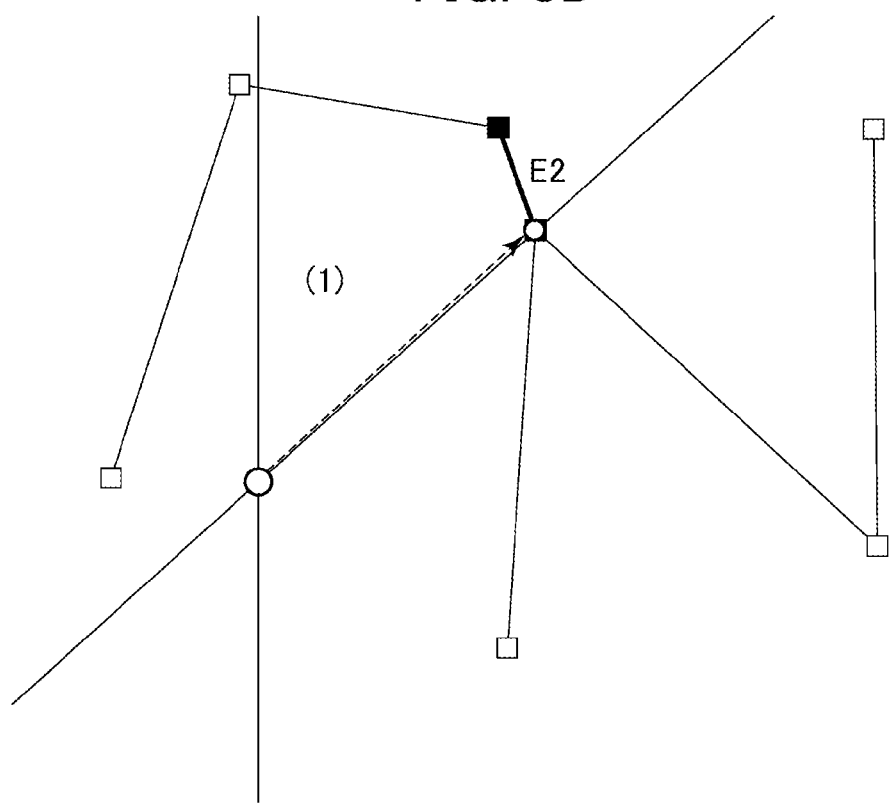

Note here the nearest point corresponds to a cross point where a normal extending from an AC to each edge crosses the edge. When the cross point is not located on an edge, the nearest point corresponds to the end of the edge closer to the cross point. Specifically, in the case shown in FIG. 8C, for example, as a cross point where the edge E0 crosses a normal extending from the AC to the edge E0 is located on the edge E0 and the cross point belongs to the area 7, it is determined that the edge E0 belongs to the area 7 and the cross point is determined as the nearest point of the edge E0. Meanwhile, in the case shown in FIG. 8D, for example, as a cross point where a normal extending from the AC to the edge E2 crosses the edge E2 is not located on the edge E2, the end (node) of the edge E2 closer to the cross point is determined as the nearest point. Further, as the nearest point belongs to the area 1, it is determined that the edge E2 belongs to the area 1.

Figure 8E:
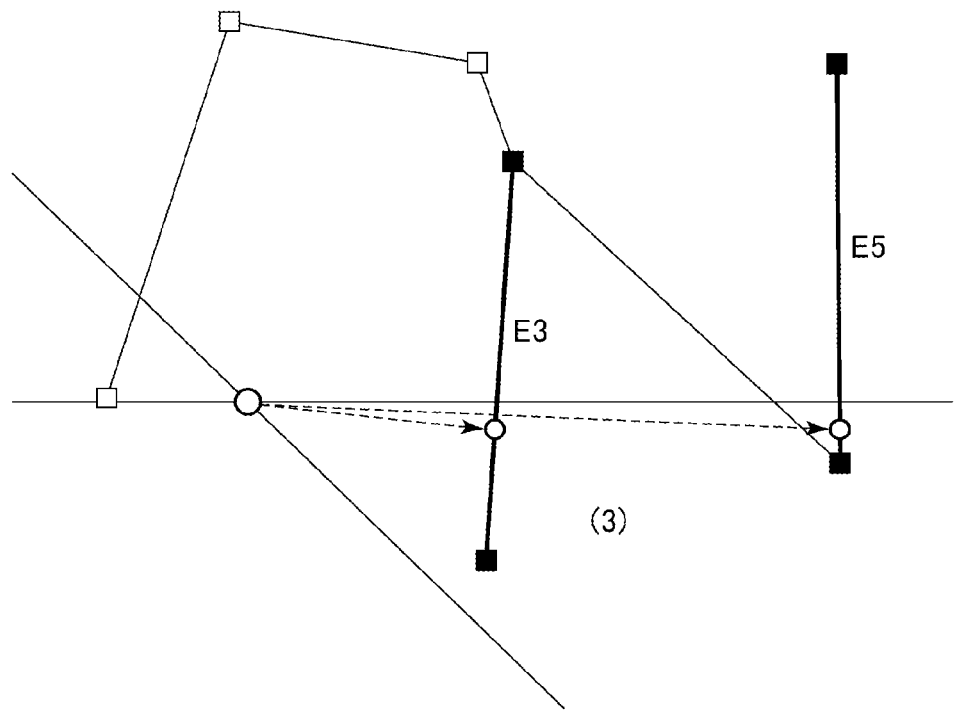
Figure 8F:
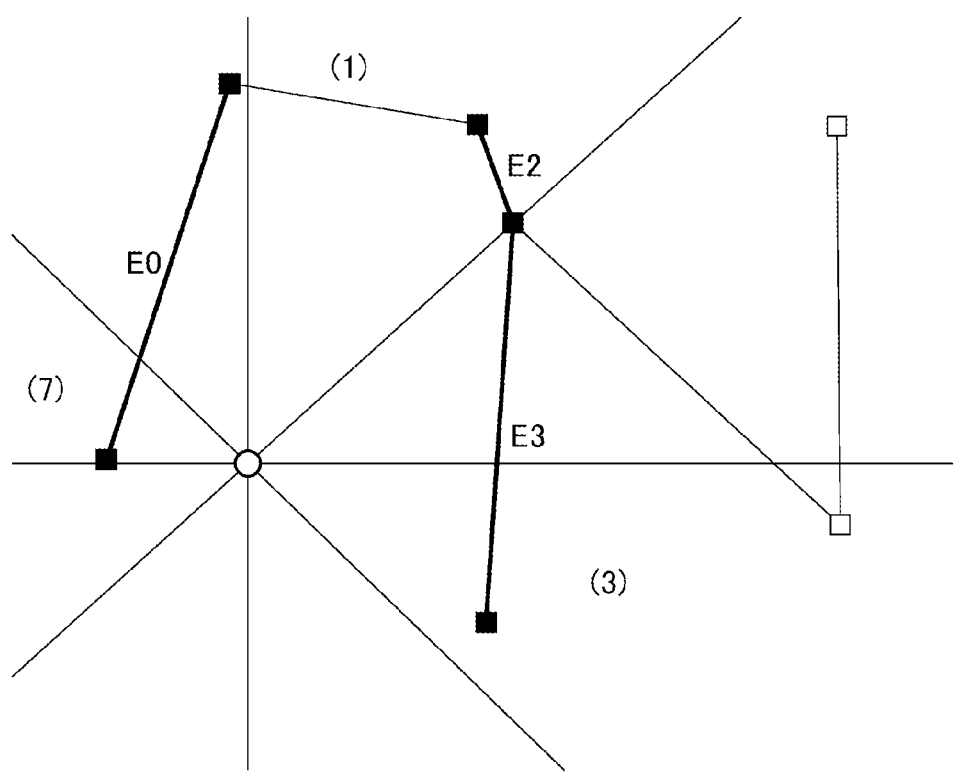

When there are two or more edges in a single area, an edge of which nearest point is located closer to the AC is determined as the nearest edge for the area. For example, when nearest points of two respective edges are included in a single area, like the edges E3 and E5 in FIG. 8E, an edge having the nearest point located closer to the AC is determined as the nearest edge for the area. That is, in the case as shown in FIG. 8E, the edges E3 and E5 have nearest points in the area 3, and the edge E3 is determined as the nearest point edge for the area 3. In this manner, the nearest edge in each area is determined. FIG. 8F shows the edges determined as described above.

The ray cast detection unit 210 executes ray cast detection, to be described above, between the respective both ends of the nearest edge in each area, determined by the nearest edge determining unit 209, and an AC. When the ray cast detection is successful between the AC and any one of the respective both ends, the nearest edge obtaining unit 211, to be described later, obtains that edge as a nearest edge candidate.

In addition, when ray cast detections with respect to the nearest edges in all areas fail, the AVD information obtaining unit 205 obtains an AVD ID having the subsequent priority order information. For example, like the above described example, when two or more AVD ID's (AVD ID 1-1, AVD ID 1-2) are correlated to a single priority order, AVD information correlated to the other AVD ID (AVD ID 1-2 in the above case) is obtained. Then, when ray cast detection fails with respect to all of these AVD ID's, the subsequent AVD ID (AVD ID AVD2 in the above case) is then obtained.

Note that ray cast detection is executed by determining whether or not there is a way collision or a wall, that is, an obstacle for a non-operating object, on a straight line connecting, e.g., one point (one of the ends of an edge in this case) and an AC. Specifically, when such an object is absent on the straight line, the ray cast detection is determined successful, while when such an object is present, the ray cast detection is determined failure.

Figure 8G:
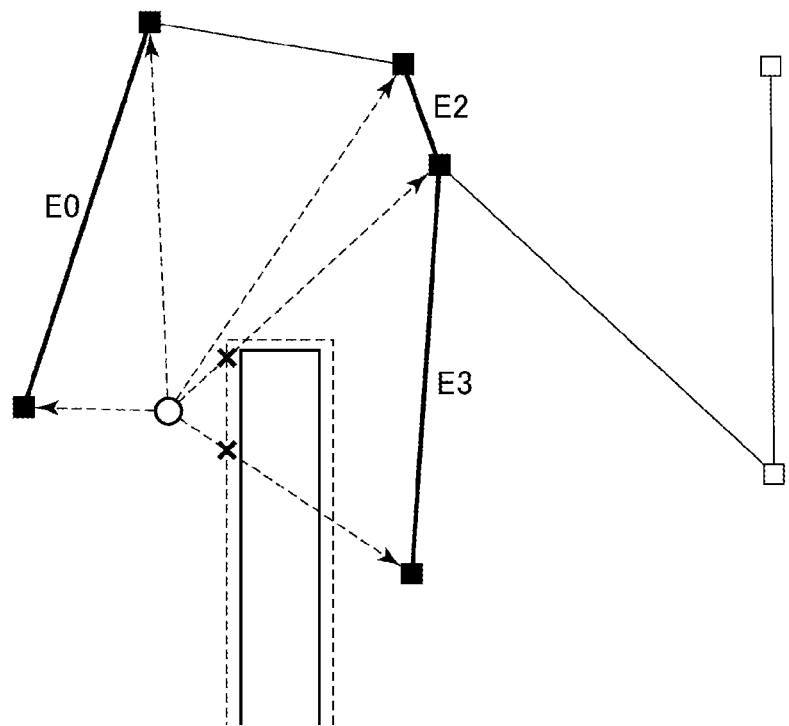

Specifically, as shown in FIG. 8G, for example, as to the edge E0, as ray cast detection with respect to the respective both ends thereof is successful, the edge E0 is determined as the nearest edge candidate. As to the edge E2 as well, as ray cast detection with respect to one end thereof is successful, the edge E2 is also determined as the nearest edge candidate. However, as to the edge E3, as there is a way collision on the straight line connecting the AC and each of the both ends of the edge E3, the ray cast detection unit 210 determines failed ray cast detection, and therefore does not determine the edge E3 as the nearest edge candidate. That is, in this case, the edges H0 and E2 are determined as the nearest edge candidates, and accordingly, the ray cast detection unit 210 causes the nearest edge obtaining unit 211 to obtain the edges E0 and E2.

Figure 8H:
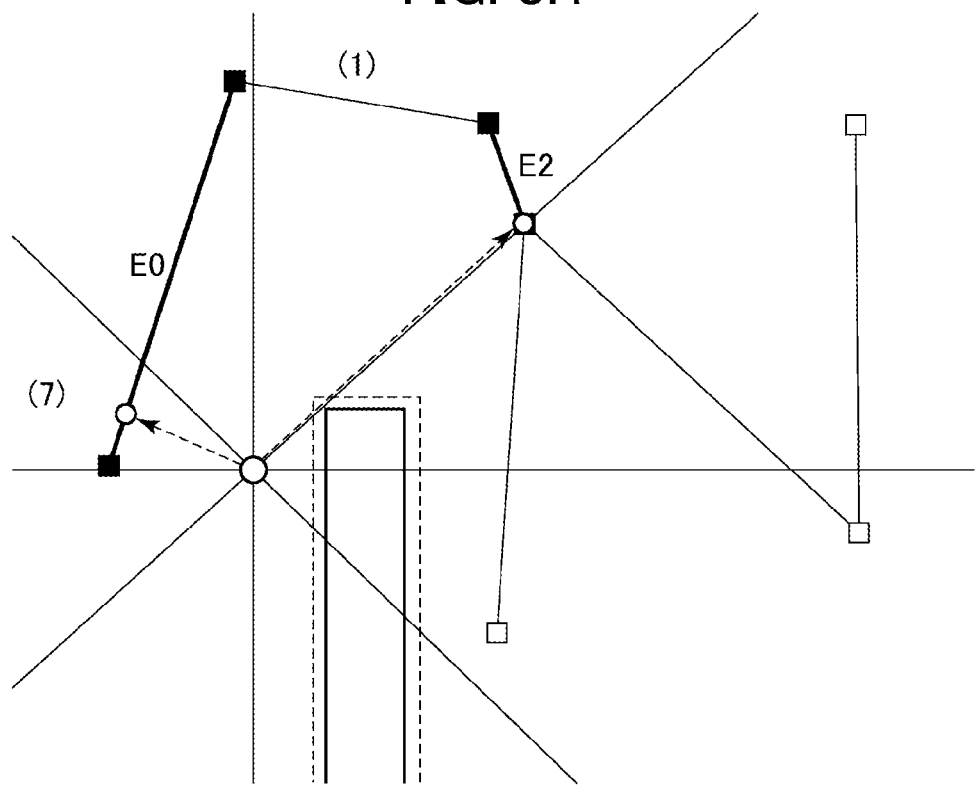
Figure 8I:
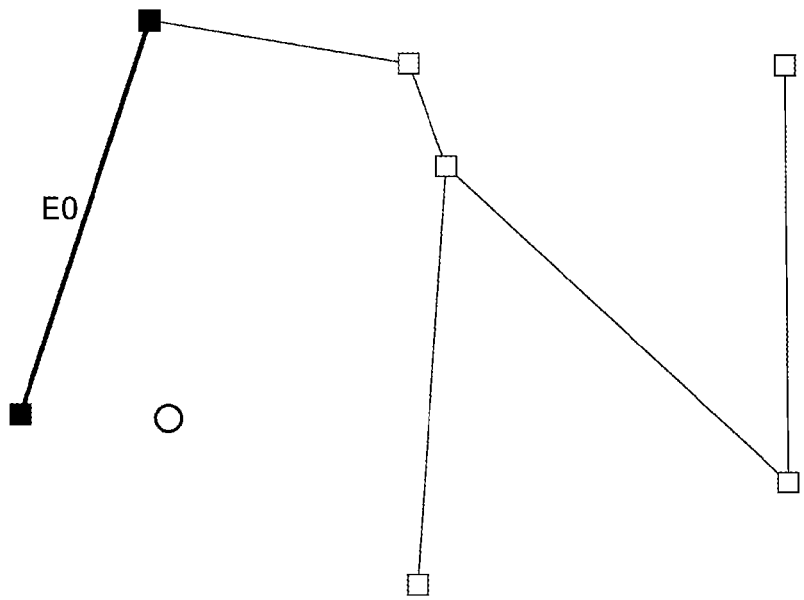

Having obtained the nearest edge candidates from the ray cast detection unit 210, the nearest edge obtaining unit 211 calculates the distance between the AC and the nearest point of each of the nearest edge candidates, and compares the calculated distances to obtain the nearest edge candidate having the shortest distance as the nearest edge. Specifically, as shown in FIG. 8H, for example, comparison between the distance from the AC to the nearest point of the edge E0 and that from the AC to the nearest point of the edge E2 shows that the distance to the nearest point of the edge E0 is shorter, and therefore, the edge E0 is obtained as the nearest edge, as shown in FIG. 8I. Note that the position information or the like on an edge is obtained from the space DB 202, and the distance or the like is calculated based on the position information. As described above, dividing into two or more areas and obtaining the nearest edge as described above can reduce a load of the object control program. Note that, however, the above is a mere example, and the nearest edge may be obtained without area dividing.

Below, a functional structure that is implemented in processing for determining an AP (corresponding to a destination to which a non-operating object is moving) is mainly described. When the nearest edge obtaining unit 211 obtains the nearest edge, the AP deploying unit 212 calculates and thus obtains position information on related AP candidates, based on the AVD information obtained by the AVD information obtaining unit 205. Note that the AVD information corresponds to AVD information for which the nearest edge is obtained. Specifically, the position information on the AP candidates 603, having been deployed as shown in FIG. 6, is calculated based on the angle information, dividing number information, AP radius information, and so forth, contained in the AVD information, as described above.

The ray cast detection unit 210 executes ray cast detection between the AC and each AP candidate. Further, the ray cast detection unit 210 executes ray cast detection also with respect to the respective both ends of the nearest edge. Specifically, for example, ray cast detection is executed between, e.g., the AC 602 and the AP candidate 603, shown in FIG. 6, and also between the respective both end nodes 606, 607 of the nearest edge 605 and each AP candidate 603. Details of the ray cast detection here are similar to those described above. Meanwhile, when ray cast detection fails with respect to all of the AP candidates, the AVD information obtaining unit 205 obtains AVD information having subsequent priority order information, which is similar to the above described case of failed ray cast detection. Note that in this case, when there is AVD information with failed ray cast detections with respect to the nearest edges in all of the areas, as described above, further AVD information is obtained according to the priority order information, beginning with one having priority order information subsequent to that of the AVD information with failure.

When ray cast detection between each of the AP candidates and the AC and that between the respective both ends of the nearest edge and the AC are successful, the space check detection unit 213 executes space check, using, e.g., a bounding box stored so as to be correlated to the non-operating object.

Figure 9:
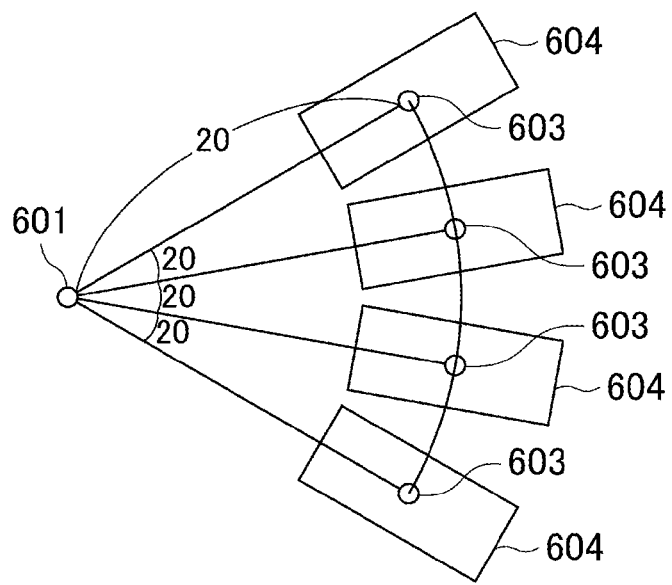
FIG. 9 is a diagram explaining one example of a bounding box in this embodiment.

Note here that the bounding box 604 is a box corresponding to a space that is necessary for the non-operating object placed on the AP candidates 603, as shown in FIG. 9, for example. The space check detection unit 213 determines that the space check detection is successful when the bounding box does not interfere with a wall or the like in the virtual space, and failure when the bounding box interferes. The shape and size of the bounding box and a position for placing the bounding box are determined in advance. In controlling movements of two or more non-operating objects, the bounding box may have a different shape and size from respective non-operating objects. Further, two or more bounding boxes having different shapes and sizes may be placed on a non-operating object, depending on the shape or the like of the non-operating object.

The AP obtaining unit 214 obtains the respective AP candidates with space check determined successful by the space check detection unit 213, and calculates the distance from each AP candidate to the non-operating object. Then, the distances between the respective AP candidates and the non-operating object are compared to each other to obtain the AP candidate having the shortest distance as an AP.

The non-operating object action control unit 402 moves the non-operating object in the virtual space to a position indicated by the obtained AP position information as a destination. Based on the position information on the AP and on the non-operating object, the arrival determining unit 215 determines whether or not the non-operating object has arrived at the AP, and upon determination that the non-operating object has arrived at the AP, the non-operating object action control unit 402 causes the non-operating object to perform an action identified by the action ID stored correlated to the AVD ID correlated to the AP.

Thus, it is possible to set a destination (AP) as to an object of interest for a non-operating object in the virtual space, based on the type of the object of interest, an action which the non-operating object is caused to perform with respect to the object of interest, the position of an obstacle, or the like, and to move the non-operating object to the destination to have the non-operating object to perform a predetermined action.

Below, it will be described that a main functional structure that is implemented when the nearest edge cannot be obtained with respect to any AVD or an AP cannot be obtained with respect to any AVD.

The shortest edge obtaining unit 216 obtains the edge ID of the shortest edge, that is, an edge located closest to a specified object of interest, based on the position information on the object of interest, obtained by the object of interest specifying unit 204, and the position information on the edge.

The ray cast detection unit 210 executes ray cast detection between the respective both ends of the shortest edge obtained by the shortest edge obtaining unit 216 and the AC related to the AVD having the priority order information 1. Note that the position information on the AC is calculated and thus obtained by, e.g., the AC position information obtaining unit 207, similar to the above, and the ray cast detection unit 210 executes ray cast detection, using the obtained position information on the AC. When the ray cast detection is successful between any one of the ends and the AC, successful ray cast detection is concluded, which is similar to the above described case. When the ray cast detection is successful, AVD information having the AVD ID 360 is obtained from the AVD information storage unit 219. The AVD information having the AVD ID 360 is information including, for example, angular information 360° (that is, circular) and dividing number information indicating a dividing number different from that of the AVD information having the priority order information 1, and other information (distance information or the like) is set in advance such that interference is avoided between a non-operating object and a way collision or the like.

The AP deploying unit 212, the ray cast detection unit 210, the space check detection unit 213, and the AP obtaining unit 214 execute processing similar to that for obtaining an AP, based on the AVD information having the AVD ID 360 and the shortest edge. When an AP is obtained, the non-operating object starts moving to the AP as a destination. When the non-operating object arrives at the AP, the non-operating object is then caused to perform an action stored correlated to the AVD ID.

Meanwhile, when no AP can be obtained even using the AVD information having the AVD ID 360, the AP generating unit 217 generates an AP on the shortest edge, based on the position of the object of interest. Specifically, a cross point where a normal extending from the position of the object of interest to the shortest edge crosses the shortest edge is determined as an AP, and position information on the AP is sent as an AP (final AP) to the action control unit 201. At the same time, the non-operating object starts moving to the final AP as a destination, and when the non-operating object arrives at the final AP, the non-operating object is caused to perform an action stored correlated to the AVD ID 360.

Thus, it is possible to set an AP and to have a non-operating object to perform a predetermined action even when the nearest edge cannot be obtained with respect to any AVD or when an AP cannot be obtained with respect to any AVD.

Meanwhile, when the ray cast detection unit 210 executes ray cast detection between the respective both ends of the shortest edge and the AC (an AC related to AVD having the priority order information 1) and fails, the substitute point obtaining unit 218 obtains position information that substitutes (substitute point) the position information on the object of interest specified by the object of interest specifying unit 204, based on the position information on the shortest edge, the object of interest, and the non-operating object, and that of the way collision.

Figure 10:
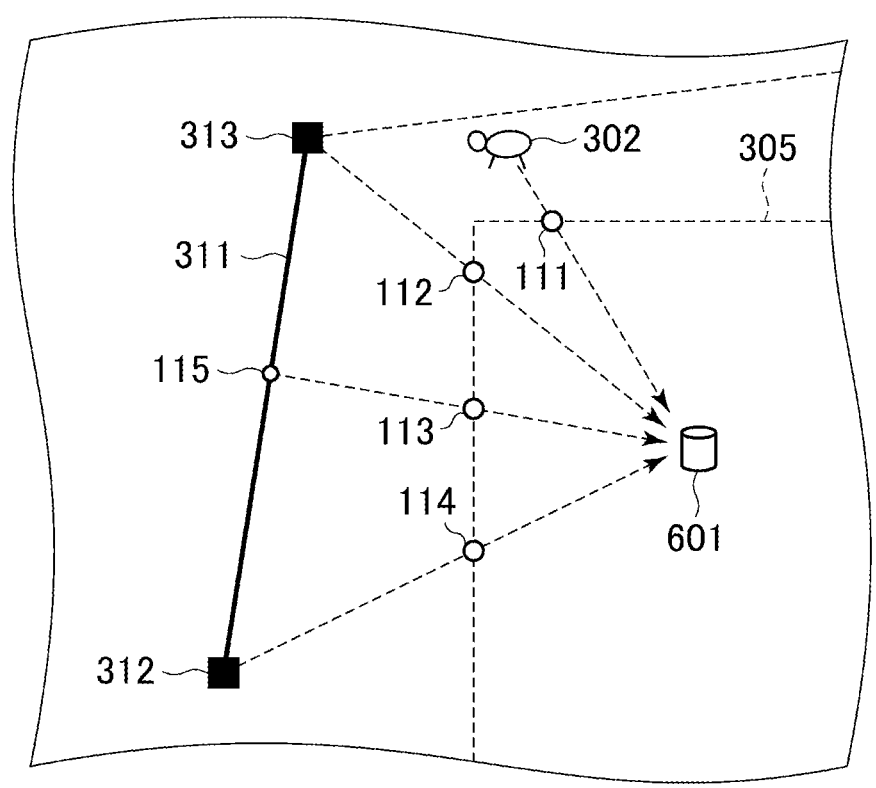
FIG. 10 is a diagram explaining one example of a substitute point obtaining processing in this embodiment.

Specifically, as shown in FIG. 10, for example, the substitute point obtaining unit 218 obtains position information on a cross point where the straight line connecting the non-operating object and the object of interest 601 crosses the border line of the way collision 305 as a first candidate point 111 for a substitute point. Further, position information on the respective cross points where the respective straight lines connecting the object of interest 601 and the respective both ends 312, 313 of the shortest edge 311 cross the border line of the way collision 305 as second and fourth respective candidate points 112, 114 for the substitute point. Still further, position information on a cross point where a normal extending from the object of interest 601 to the shortest edge 311 crosses the shortest edge 311 is obtained as the third candidate point 113 for the substitute point. Then, position information on the respective candidate points and the AC is calculated, and position information on a candidate point (the third candidate point 113 in this example) having the shortest distance to the AC is extracted from those on the first to fourth candidate points 111 to 114.

Further, the AVD information obtaining unit 205 obtains, e.g., substitute AVD information, that is, AVD information having the AVD ID DA, from the AVD information storage unit 219. The AVD information having AVD ID DA is set in advance such that, e.g., a non-operating object does not interfere with a way collision or the like. Specifically, for example, the substitute AVD information includes AC distance information same as that of the AVD information having the priority order information 1 and a dividing number information different from that of the AVD information.

The AP deploying unit 212, the ray cast detection unit 210, the space check detection unit 213, and the AP obtaining unit 214 execute processing similar to that for obtaining the above described AP, based on the AVD information having the AVD ID DA. Note that in this case the substitute position information, instead of the position information on the object of interest, is used in calculation of the position information on the AC or the like, and AP candidates are deployed based on the substitute position information. When an AP is obtained, the non-operating object starts moving to the AP as a designation, and when the non-operating object arrives at the AP, the non-operating object is caused to perform an action stored correlated to the AVD ID. Note that although it is explained substitute AVD information is used as described above, original AVD information may be used instead.

Meanwhile, when no AP can be obtained even using the AVD information having the AVD ID DA, the AP generating unit 217 generates an AP on the shortest edge, based on the position of the object of interest, similar to the described above. Then, also similar to the above, a non-operating object starts moving to the final AP as a designation, and when the non-operating object arrives at the final AP, the non-operating object is caused to perform an action stored correlated to the AVD ID DA.

Thus, it is possible to set an AP for a non-operating object even when the object of interest is located an inside of a way collision (e.g., when a non-operating object cannot reach the object of interest), as shown in FIG. 10, for example, and also to have the non-operating object to perform a predetermined action once the non-operating object arrives at the AP.

In the following, a flow of processing by the object control device will be described. FIGS. 11 to 14 are diagrams explaining an outline of the flow of processing by the object control device.

Figure 11:
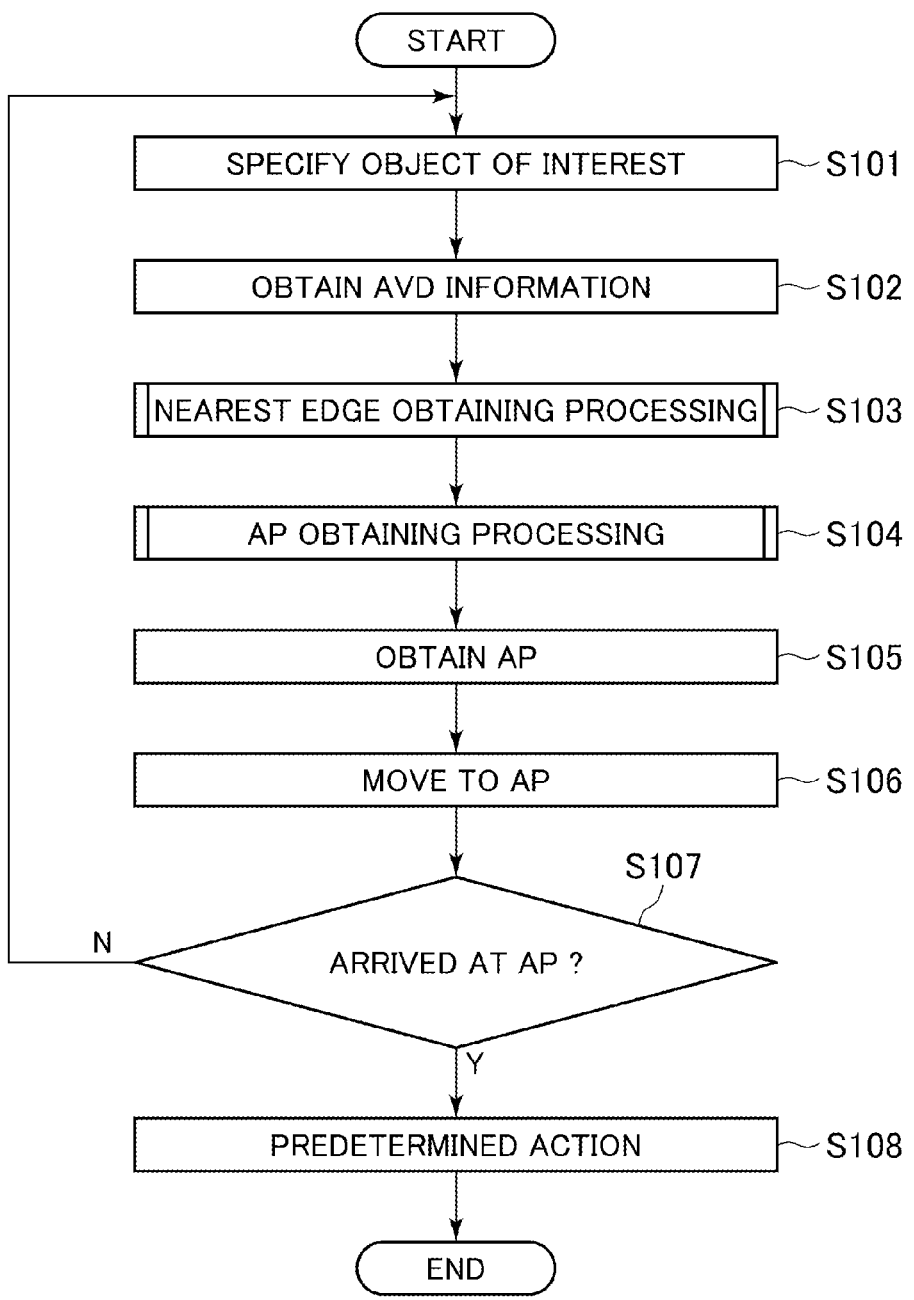
FIG. 11 is a diagram explaining an outline of a flow of an object control device according to this embodiment.

As shown in FIG. 11, the object of interest specifying unit 204 specifies an object of interest for a non-operating object according to a predetermined criterion, and obtains the object of interest ID of and position information on the object of interest (S101). Thereafter, the AVD information obtaining unit 205 obtains the AVD information stored correlated to the object of interest ID obtained by the object of interest specifying unit 204, based on the priority order information thereon (S102).

Figure 12:
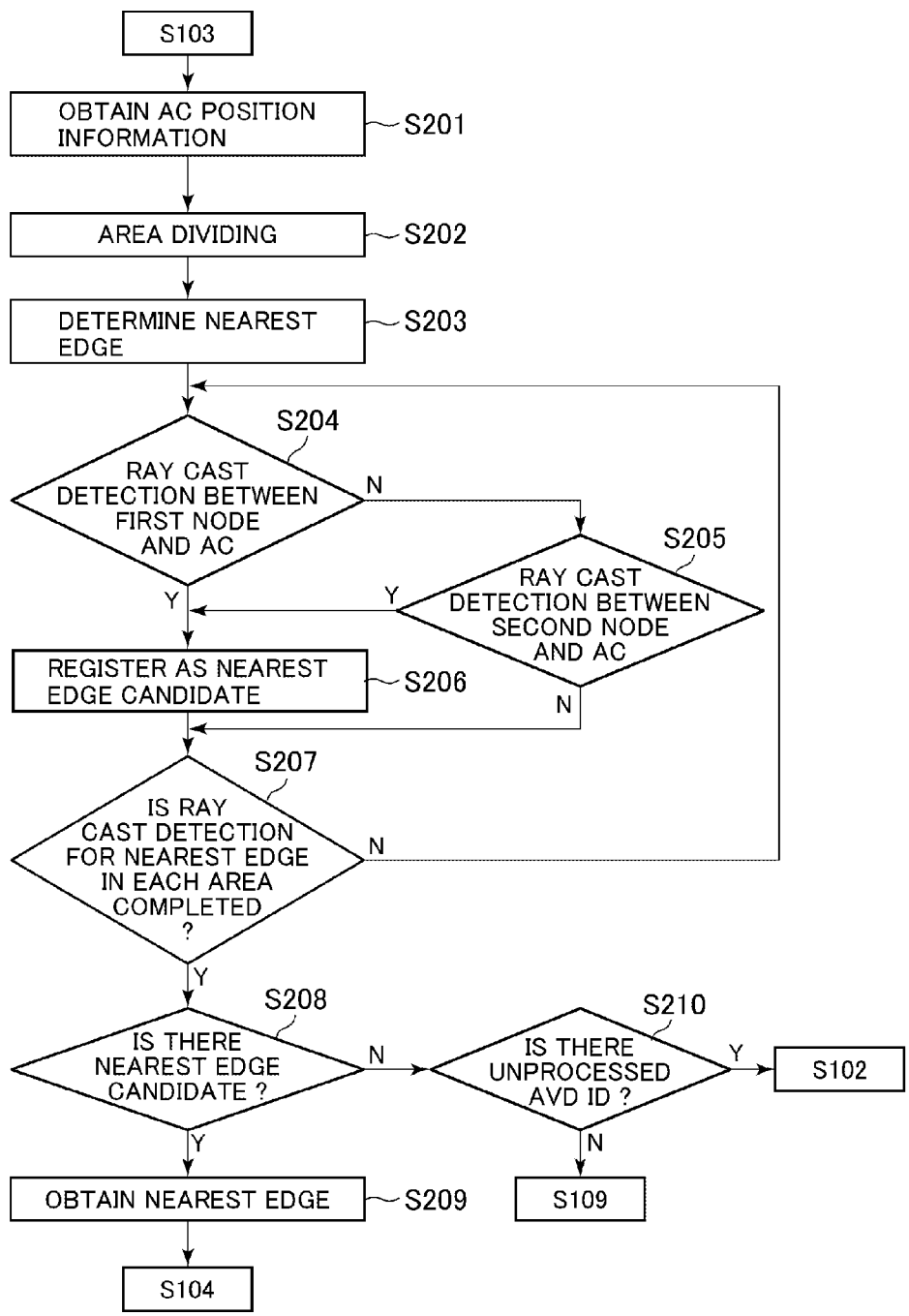
FIG. 12 is a diagram explaining an outline of a flow of the object control device according to this embodiment.

Then, as shown in S201 to S209, to be described later, nearest edge obtaining processing for obtaining the nearest edge is executed (S103). Specifically, as shown in FIG. 12, initially, the AC position information obtaining unit 207 calculates and thus obtain position information on an AC related to the obtained AVD information, based on the position information on the object of interest, which is obtained by the object of interest specifying unit 204, and the AVD information obtained by the AVD information obtaining unit 205, (S201).

Thereafter, based on the position information on the AC obtained by the AC position information obtaining unit 207, the area dividing unit 203 divides the virtual space into two or more areas (S202). Then, the nearest edge determining unit 209 determines the nearest edge, or an edge having the shortest distance from the AC, in each area resulting from the dividing by the area dividing unit 208 (S203).

Thereafter, the ray cast detection unit 210 executes ray cast detection between the respective both ends of the nearest edge in each area, determined by the nearest edge determining unit 209, and the AC. Specifically, initially, ray cast detection is executed between a first end (first node) of the nearest edge and the AC (S204). When the ray cast detection fails, ray cast detection is then executed between the second end (second node) of the nearest edge and the AC (S205).

When the ray cast detection is successful at either S204 or S205, the flow advances to S206, where the nearest edge obtaining unit 211 obtains edge ID information identifying the nearest edge as a nearest edge candidate (S206). Meanwhile, when the ray cast detection fails at S205, the flow advances to S207.

Thereafter, whether or not ray cast detection with respect to the nearest edge in each area has been completed is determined (S207). When it is determined that the ray cast detection has not yet been completed, the flow returns to S204. Meanwhile, when it is determined that the ray cast detection has been completed, the flow advances to S208.

Then, whether or not a nearest edge candidate has been obtained is determined (S208). When it is determined at S208 that any nearest edge has been obtained, the nearest edge obtaining unit 211 calculates the distance from the AC to the nearest point of each nearest edge candidate, and compares the distances to obtain the nearest edge candidate having the shortest distance as the nearest edge (S209). Then, the flow advances to S104.

Meanwhile, when it is determined at S208 that the nearest edge has not yet been obtained, it is then determined whether or not there is any unprocessed ADV ID left (S210). Specifically, for example, whether or not the nearest edge obtaining processing has been executed with respect to all of the ADV ID's stored correlated to the specified object of interest ID is determined. When it is determined that there is any unprocessed AVD ID left, the flow advances to S102, where ADV information having the subsequent priority order is obtained. Meanwhile, when absence of unprocessed ADV ID is determined, the flow advances to S109, to be described later.

Figure 13:
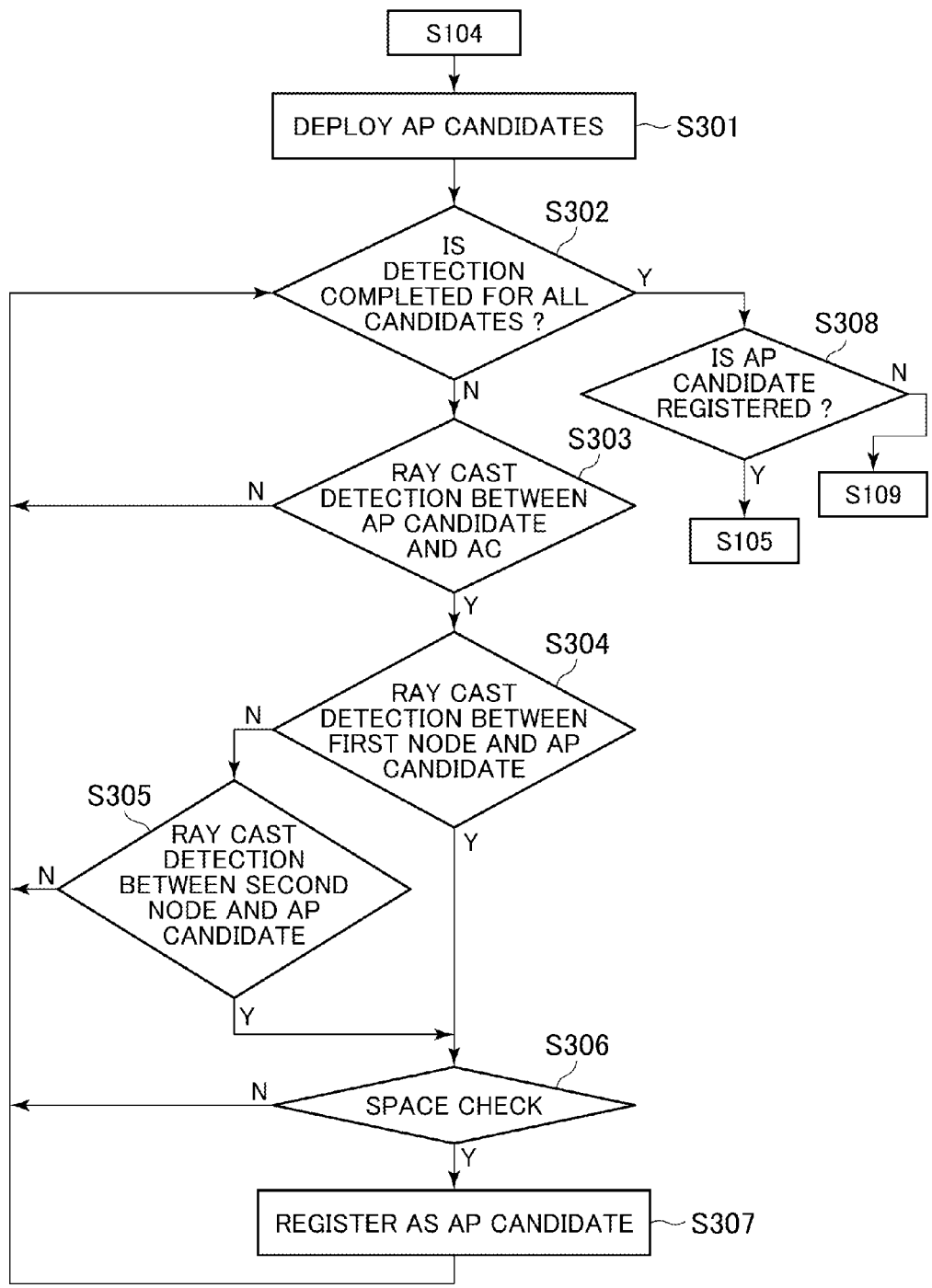
FIG. 13 is a diagram explaining an outline of a flow of the object control device according to this embodiment.

Based on the AVD information related to the nearest edge obtained at S209, AP obtaining processing is executed (S104). Specifically, as shown in FIG. 13, the AP deploying unit 212 initially deploys AP candidates, based on the AVD information, and then obtains position information on the respective AP candidates (S301).

Thereafter, whether or not detection to be described later has been made to an AP candidate is determined (S302). When it is determined that detection has not yet been made to all of the AP candidates, the ray cast detection unit 210 sequentially obtains the position information on the AP candidates, and executes ray cast detection between each AP candidate and the AC (S303). Meanwhile, when it is determined that the detection has been made to all of the AP candidates, the flow advances to S308, to be described later.

When it is determined at S303 that ray cast detection between an AP candidate and the AC is successful, the ray cast detection unit 210 executes ray cast detection between that AP candidate and the first node of the nearest edge obtained at S209 (S304).

When the ray cast detection at S304 fails, ray cast detection is then executed between the AP candidate and the second node of the nearest edge obtained at S209 (S305). When the ray cast detection at S305 fails, the flow returns to S302.

Meanwhile, when the ray cast detection is successful at S304 or S305, the space check detection unit 213 executes space check (S306). When the space check fails, the flow returns to S302. Meanwhile, when space check is successful, the AP obtaining unit 214 registers the position information on the AP candidate as an AP candidate (S307) before the flow returns to S302. When it is determined that the ray cast detection has been executed with respect to all of the AP candidates, it is then determined whether or not an AP candidate is registered (S308). When there is any AP candidate determined registered, the flow advances to S105, while, when no registered AP candidate is determined, the flow advances to S109. Note here that although it is described that for every successful ray cast detection between one AP candidate and the AC, ray cast detection is made between the AP and a node in the above, this is not limiting. That is, different but substantially identical processing may be applicable, such as processing in which ray cast detection is first executed between all respective AP candidates and the AC, and then, as to the AP candidates with successful ray cast detection, ray cast detection is executed between the AP candidate with successful ray cast detection and a node.

The AP obtaining unit 214 calculates the distance from each registered AP candidate to the non-operating object, and then compares the distances from the respective AP candidates to the non-operating object to obtain an AP candidate having the shortest distance as an AP (S105).

Thereafter, the non-operating object action control unit 402 moves the non-operating object toward a position indicated by the position information on the obtained AP (S106).

Thereafter, based on the position information on the AP and that of the non-operating object, the arrival determining unit 215 determines, e.g., for every predetermined period of time, whether or not the non-operating object has arrived at the AP (S107). When it is determined that the non-operating object has not yet arrived at the AP, the flow returns to, e.g., S101, where processing similar to the above described processing is executed. Meanwhile, when the arrival determining unit 215 determines that the non-operating object has already arrived at the AP, the non-operating object is caused to perform an action stored correlated to the AVD information correlated to the AP (S108).

In the following, a flow of processing when it is determined that absence of an unprocessed AVD ID is not existed at S210 or when it is determined that ray cast detection has been executed with respect to all of the AP candidates at S303 will be described referring to FIG. 14.

Figure 14:
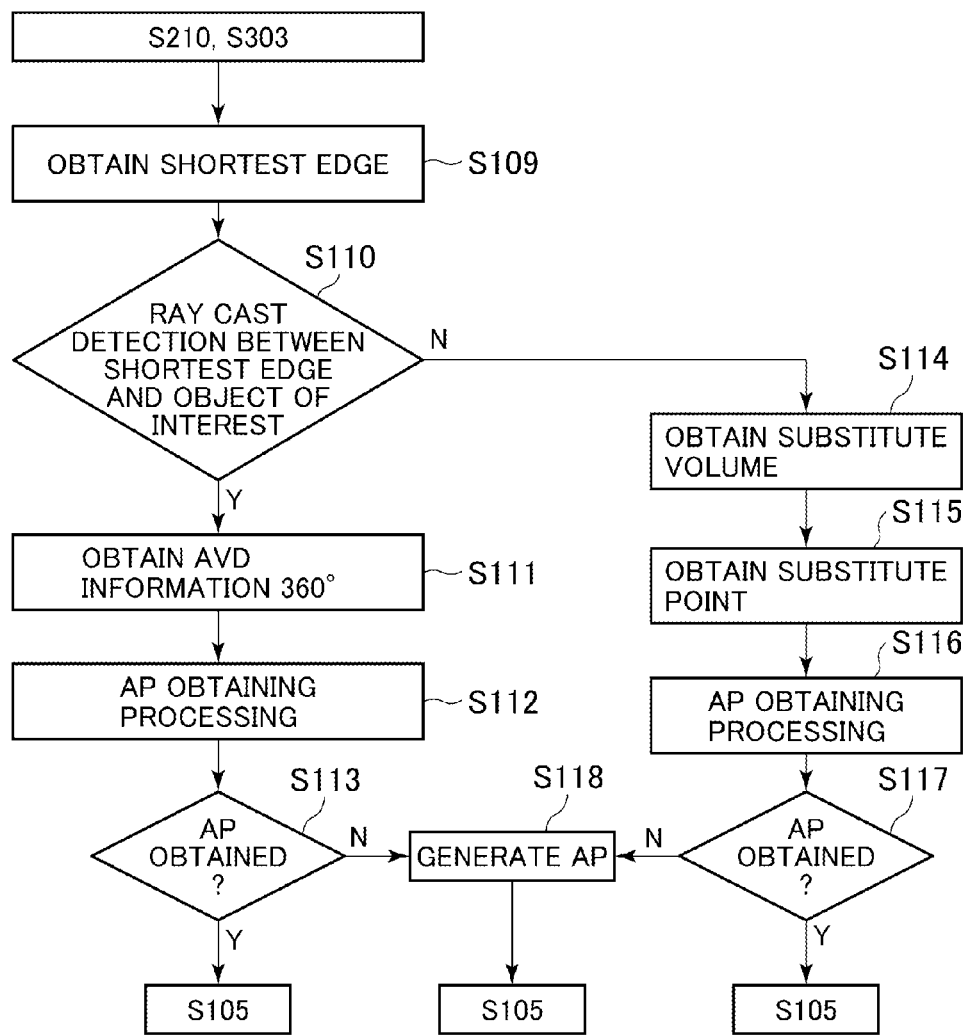
FIG. 14 is a diagram explaining an outline of a flow of the object control device according to this embodiment.

As shown in FIG. 14, the shortest edge obtaining unit 216 initially obtains the edge ID of the shortest edge, that is, an edge located closest to the specified object of interest, based on the position information on the object of interest obtained by the object of interest specifying unit 204 and the position information on an edge (S109).

The ray cast detection unit 210 executes ray cast detection between the both ends of the shortest edge obtained by the shortest edge obtaining unit 216 and an AC related to the AVD having the priority order information 1 (S110). Similar to the described above, when it is determined that ray cast detection between one of the both ends of the shortest edges and the AC is successful, it is determined that the ray cast detection is successful, and a detailed flow thereof is not described here.

Upon successful ray cast detection at S110, AVD information having the AVD ID 360 is obtained from the AVD information storage unit 219 (S111). Then, based on the AVD information, which has the AVD ID 360 and is obtained at S111, and the shortest edge, which is obtained at S110, processing similar to the AP obtaining processing at S104 is executed (S112). Thereafter, whether or not an AP candidate has been obtained is determined (S113). When it is determined that an AP candidate has been obtained at S112, the flow advances to S105.

Meanwhile, upon determination of failed ray cast detection at S110, the AVD information obtaining unit 205 obtains AVD information having AVD ID DA (substitute volume) from, e.g., the AVD information storage unit 219 (S114).

Then, based on the position information on the shortest edge, the object of interest, and the non-operation object and that of the way collision, the substitute point obtaining unit 218 obtains position information (substitute position information) that substitutes the position information on the object of interest specified by the object of interest specifying unit 204 (S115).

Further, based on the AVD information having the ADV ID DA, obtained at S114, and the shortest edge, obtained at S110, processing similar to the AP obtaining processing at S104 is executed (S116). In this case, substitute position information, instead of the position information on the object of interest, is used to obtain the position information on the AC in calculation of the position information on the AC, and AP candidates are deployed based on the position information on the AC. Then, whether or not an AP candidate has been obtained is determined (S117). Upon determination that an AP candidate has been obtained at S116, the flow advances to S105.

Meanwhile, when it is determined that no AP candidate has been obtained at S112 or S116, the AP generating unit 217 generates an AP on the shortest edge, based on the position of the object of interest (S118). Then, the flow advances to S105, where the AP obtaining unit 214 obtains the generated AP as an AP. Note that the above described flow of processing may be executed for every predetermined frame period or for every completion of the processing flow as the above described flow of processing takes time to complete. That is, according to this embodiment, as the non-operating object moves, an object of interest is specified and a destination is set. Accordingly, the destination will change depending on the movement.

Note that the flow of processing shown in FIGS. 11 to 14 is a mere example, and various modifications are possible. For example, a flow substantially identical to the structure described in the above embodiment, a flow producing a substantially identical effect, or a flow capable of achieving a substantially identical goal can substitute the above described flow.

The present invention is not limited to the above described embodiment, and various modifications are possible. For example, a structure substantially identical to that which is described in the above embodiment, a structure producing a substantially identical effect, or a structure capable of achieving an identical goal can substitute the above described structure.

Specifically, for example, the numbers of the operating object, the non-operating object, and the object of interest are not limited to those mentioned above, and there may be two or more operating objects, non-operating objects, and objects of interests. In this case, the plurality of operating objects may be operated by one or more users, and the plurality of non-operating objects may be controlled independently by the non-operating object control unit. Although an operating object and a non-operating object are mentioned in the above description, an operating object does not necessarily act according to a user's instruction, and may act according to a predetermined program or the like, rather than a user's instruction, similar to the non-operating object.

Note that destination candidate information storage means defined in claims includes, e.g., the ranking information storage unit 206 and the AVD information storage unit 219; destination information obtaining means includes, e.g., the AP deploying unit 212, the space check detection unit 213, and the AP obtaining unit 214; path information specifying means includes the nearest edge obtaining unit 211.

Below, besides the above, a case of controlling a part of a non-operation object, such as a head or face, will be described.

Figure 15:
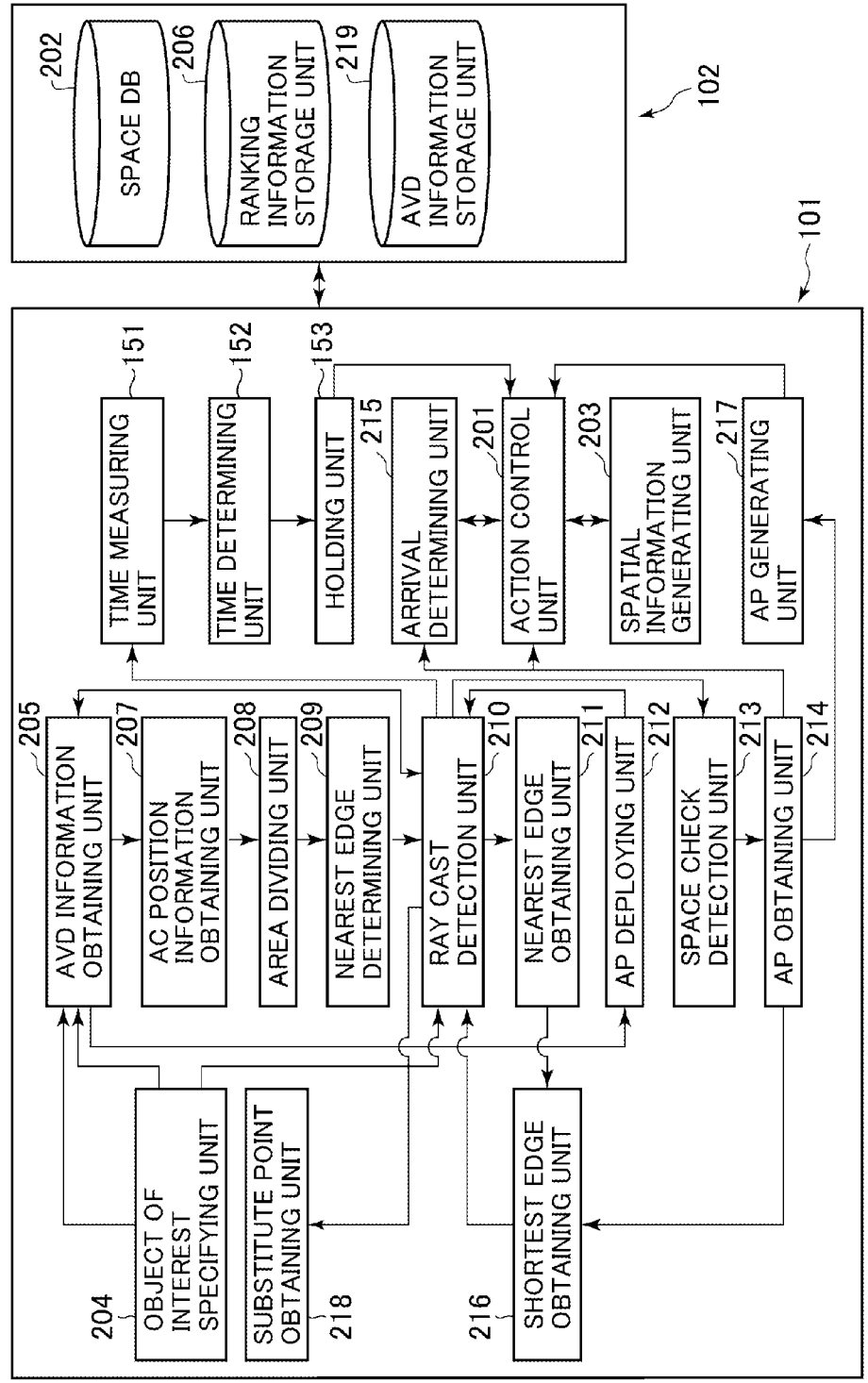
FIG. 15 is a diagram explaining a functional structure for implementing processing for controlling a direction in which a part of a non-operating object is directed.

FIG. 15 is a diagram explaining a functional structure of an object control device that is implemented in executing processing for controlling a direction in which a part of a structure constituting a non-operating object is directed. As shown in FIG. 15, the object control device 100 has a time measuring unit 151, a time determining unit 152, and a holding unit 153, in addition to the structure shown in FIG. 2. Note that, for brevity of description, a case in which a virtual space shown in FIG. 16 is implemented in the object control device 100 will be described as an example in the following.

Note here that, as shown in FIGS. 16A to 16E, a non-operating object 161 has a face or head 162 including eyes or the like as a part of the structure constituting the non-operating object 161. In the virtual space, a wall 163, as an obstacle for the non-operating object 161, and an object of interest 164 are placed. In the following, a point similar to that which has been described above will not be described again.

For example, the object of interest action control unit 403 moves the object of interest 164 along a path set beforehand. Specifically, as shown in FIGS. 16A to 16E, for example, the object of interest action control unit 403 moves the object of interest 164 in the direction indicated by the arrow in the diagram (downward in the diagram). Note that the path is stored in the space DB 202, similar to the above described. Although only one object of interest 164 is shown in FIGS. 16A to 16E, two or more objects of interest may be moved.

The object of interest specifying unit 204 specifies one or more objects of interest as an object/objects of interest for the non-operating object according to a predetermined criterion, and further specifies an object having the highest interest level (interest level 1) among the specified objects of interest, the interest level indicative of an priority order of interest. Note here that the interest level is changeable information that is determined based on the position information on respective objects of interest, that of a non-operating object, point numbers correlated to other objects of interest, and so forth, and the interest level is stored in the space DB 202 together with information identifying each object of interest. Further, the object of interest specifying unit 204 obtains position information on the specified object of interest for every predetermined period. Specifically, for example, in the case shown in FIGS. 16A to 16E, the object of interest specifying unit 204 obtains position information on the object of interest 164 for every predetermined period. Note that in FIGS. 16A to 16E, for example, the object of interest 164 is specified as an object of interest, and the object of interest 164 is specified as an object of interest having the interest level 1.

For example, the ray cast detection unit 210 obtains position information on the object of interest specified by the object of interest specifying unit 204 and position information on the non-operating object from the space DB 202, and position information on the obstacle, such as a wall or the like, which constitutes an obstacle for the non-operating object. Then, based on the position information on the object of interest, the non-operating object, and the obstacle, the ray cast detection unit 210 executes ray cast detection between the object of interest and the non-operating object. Specifically, whether or not there is an obstacle on the straight line connecting the object of interest and the non-operating object is determined, and upon determination of absence of such an obstacle, successful ray cast detection is concluded. In this case, position information on a part (e.g., a head) of the structure constituting the non-operating object may be used as the position information on the non-operating object. When two or more objects of interest are specified, the above described ray cast detection is executed with respect to each of the object of interests.

Figure 16A:
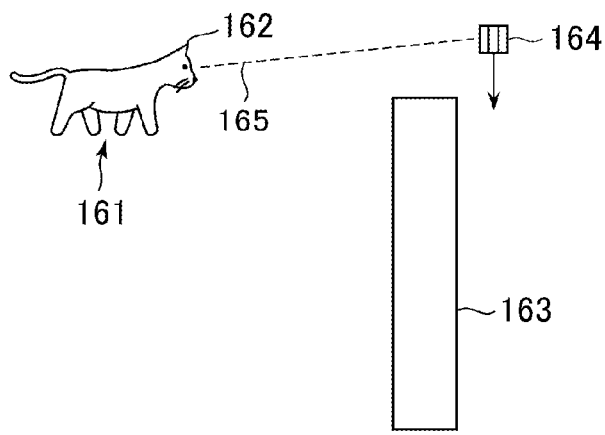
FIG. 16A is a diagram explaining an example of processing for controlling a direction in which a part of a non-operating object is directed.

Specifically, in the case shown in FIG. 16A, for example, as there is no wall 163 or the like on the straight line connecting the object of interest 164 and the non-operating object 161, the ray cast detection unit 210 determines the ray cast detection is successful. Meanwhile, in the case shown in FIG. 16B, in which the wall 163 is present on the line 166 connecting the object of interest 164 and the non-operating object 161, the ray cast detection unit 210 determines that the ray cast detection fails.

The time measuring unit 151 starts to measure a period of time upon determination of presence of an object between one or more objects of interest and the non-operating object. Specifically, in the example above, when the object of interest 164 has moved to the position indicated in FIG. 16B, the object of interest 164 starts time measurement. Then, the time determining unit 152 determines whether or not the period of time measured by the time measuring unit 151 has reached a predetermined period of time. When the time determining unit 152 determines that the period of time has reached the predetermined period of time, the holding unit 153 obtains and holds position information on the object of interest at that time. Note that the position information on the object of interest is obtained from, e.g., the object of interest action control unit 403 and/or the space DB 202. The predetermined period of time may be set to a different value, depending on the type of an obstacle or of an object of interest. The holding unit 153 may be included in the storage unit 102.

Figure 16B:
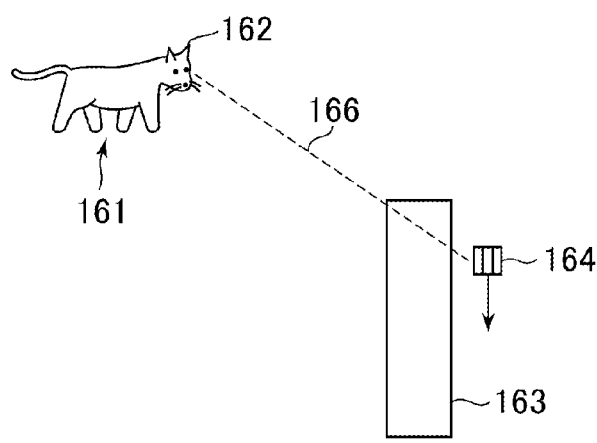
FIG. 16B is a diagram explaining an example of processing for controlling a direction in which a part of a non-operating object is directed.
Figure 16C:
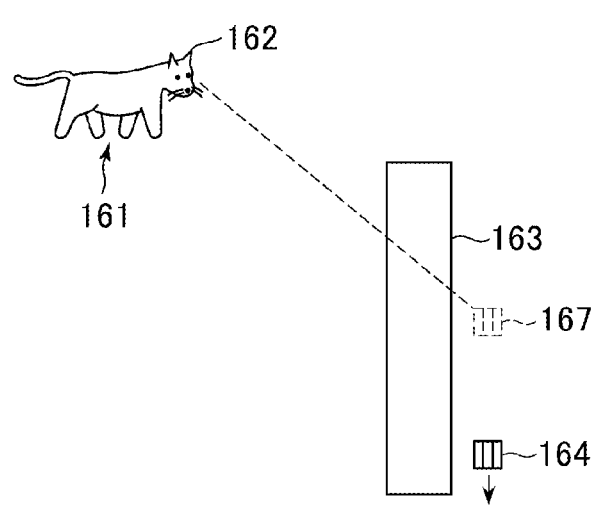
FIG. 16C is a diagram explaining an example of processing for controlling a direction in which a part of a non-operating object is directed.
Figure 16D:
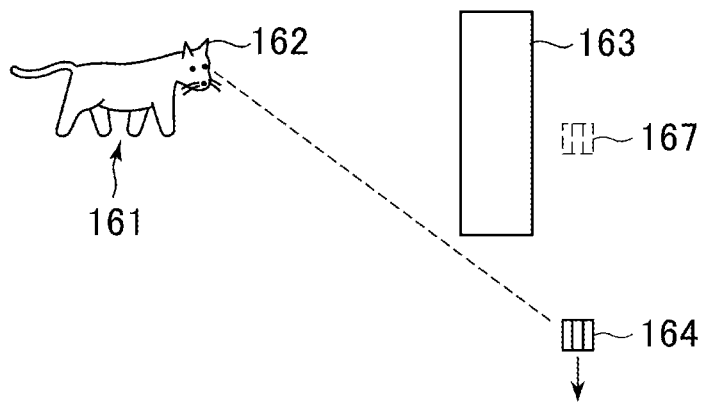
FIG. 16D is a diagram explaining an example of processing for controlling a direction in which a part of a non-operating object is directed.

Specifically, for example, suppose that the position 167 (gazed point) shown in FIG. 16C is the position of the object of interest 164 after elapse of a predetermined period of time after the time when the object of interest 164 is positioned as shown in FIG. 16B. Here, the holding unit 153 obtains and holds position information on the gazed point 167. When the ray cast detection unit 210 determines that, as to the object of interest, ray cast detection is completed successful again or when the object of interest action control unit 403 causes the object of interest to execute predetermined processing, e.g., processing for outputting sound, the holding unit 153 deletes the position information held therein on the object of interest. Specifically, as shown in FIG. 16D, for example, when ray cast detection is successful again, the position information on the object of interest 164 held in the holding unit 153 is deleted. In addition, for example, when the object of interest 164 outputs sound at the position shown in FIG. 16E, the position information on the object of interest 164 held in the holding unit 153 is deleted. Note that in a case in which two or more objects of interests are specified, the above described processing, that is, starting time measurement and obtaining and deleting position information after elapse of a predetermined period of time, is executed with respect to each of the objects of interest.

The non-operating object action control unit 402 determines whether or not an object of interest having the interest level 1 is held in the holding unit 153, to be described later, and controls the direction of a part of the non-operating object, based on the result of the determination. Specifically, in a case in which the position information on the object of interest having the interest level 1 is held in the holding unit 153, the position information having the interest level 1, held in the holding unit 153, is obtained, and the direction of a part of the non-operating object is controlled, based on the position information. For example, in the example above, in the case shown in FIGS. 16A and 16B, as the position information on the object of interest 164 (an object of interest having the interest level 1) is not held in the holding unit 153, a part, such as the face or head 162, of the structure constituting the non-operating object 161 is controlled so as to be directed toward the object of interest 164. In other words, the face or head 162 of the object of interest 164 is controlled so as to rotate and track the object of interest 164 as the object of interest 164 moves.

Figure 16E:
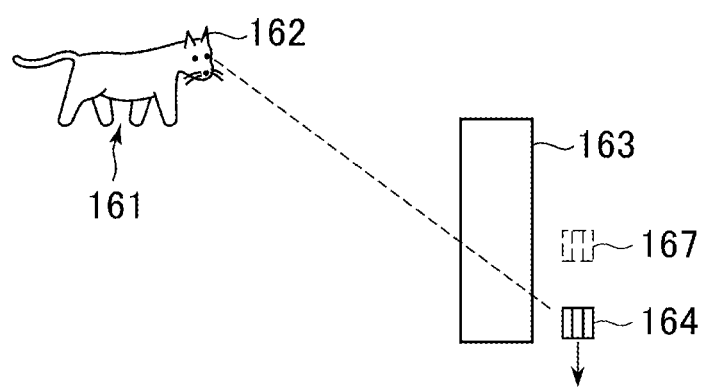
FIG. 16E is a diagram explaining an example of processing for controlling a direction in which a part of a non-operating object is directed.

Meanwhile, when it is determined that the position information on the object of interest having the interest level 1 is held in the holding unit 153, the position information on the object of interest having the interest level 1 is obtained from the space DB 202, for example, so that the direction in which a part of the structure constituting the non-operating object 161 is directed is controlled based on the position information. For example, in the example above, in the case shown in FIG. 16C, as the position information on the gazed point 167 of the object of interest 164 is held in the holding unit 153, as described above, the face or head 162 of the non-operating object 161 is controlled so as to be directed toward (to gaze at) the gazed point 167. Then, as shown in FIG. 16D, as the position information on the object of interest 164 held in the holding unit 153 is deleted once ray cast detection between the object of interest 164 and the non-operating object 161 is completed successful, the non-operating object action control unit 402 controls the face or head 162 of the non-operating object 161, based on the current position information on the object of interest 164. That is, the face or head 162 of the non-operating object 161 rotates or the like to track the object of interest 164. Further, even though ray cast detection between the object of interest 164 and the non-operating object 161 fails, as shown in FIG. 16E, the non-operating object action control unit 402 similarly controls the face or head 162 of the non-operating object 161, based on the current position information on the object of interest 164, when the object of interest 164 executes predetermined processing, such as outputting sound. In other word, the face or head 162 of the non-operating object 161 is controlled so as to be directed toward the object of interest 164 over the wall 163 as the object of interest 164 moves.

That is, in addition to the above described control of action, such as movement of a non-operating object, before the period of time measured by the time measuring unit 151 reaches a predetermined period of time, the non-operating object action control unit 402 included in the action control unit 201 controls the direction in which apart of the structure constituting the non-operating object is directed, based on the position information on an object of interest having the highest priority order (an object of interest having the interest level 1) for the non-operating object among the objects of interests obtained by the object of interest specifying unit 204. Specifically, as shown in FIGS. 16A and 16B, for example, for the non-operating object 161 representative of an animal or the like, the face or head 162 of the non-operating object 161 is controlled so as to be directed toward the object of interest 164. That is, the face or head 162 of the non-operating object 161 is rotated so as to track the object of interest 164 as the object of interest 164 moves.

Meanwhile, after the period of time measured by the time measuring unit 151 has reached the predetermined period of time, the non-operating object action control unit 402 controls the direction in which a part of the structure constituting the non-operating object is directed, based on the position information on an object of interest having the interest level 1, held in the holding unit 153. Specifically, as shown in FIG. 16C, for example, the face or head 162 of the non-operating object 161 is controlled so as to be directed toward the position (gazed point 167) indicated by the position information held in the holding unit 153 (gaze control). Note here that the position indicated by the position information held on the object of interest corresponds to the position of the object of interest having the interest level 1 at the time when the period of time measured by the time measuring unit 151 reaches the predetermined period of time, as described above.

The gaze control is continued until the object of interest becomes visible again from the non-operating object or the object of interest executes processing for outputting sound.

Specifically, for example, the ray cast detection unit 210 executes the above described ray cast detection between the non-operating object and the object of interest for every predetermined period of time even after the period of time measured by the time measuring unit 151 has reached the predetermined period of time. Then, when the ray cast detection is successful, as shown in FIG. 16D, for example, the non-operating object action control unit 402 releases the gaze control, and thereafter, executes the above described processing for controlling the direction in which a part of the structure constituting the non-operating object 161 is directed, based on the position information on the object of interest 164.

Further, also in a case where the object of interest action control unit 403 causes the object of interest to execute predetermined processing, such as, e.g., outputting sound, the non-operating object action control unit 402 similarly releases the gaze control, and then executes the above described processing, such as controlling the direction in which a part of the structure constituting the non-operating object is directed, based on the position information on the object of interest. That is, for example, suppose that the object of interest 164 outputs sound at the position shown in FIG. 16E. In the above, the non-operating object action control unit 402 controls such that the face or head 162 of the non-operating object 161, now being directed to the gamed position 167, is moved to be directed toward the position of the object of interest at the time of outputting the sound. Thereafter, the direction in which the part of the structure constituting the non-operating object 161 is directed is controlled, based on subsequent position information on the object of interest 164. That is, in this case, after the sound output, the face or head 162 is directed toward the object of interest 164 over the wall 163.

In the following, a flow of processing for controlling the direction in which a part of a structure constituting a non-operating object is directed is described referring to FIGS. 17 and 18. In the following as well, for brevity of description, a case shown in FIGS. 16A to 16E will be described as an example.

Figure 17:
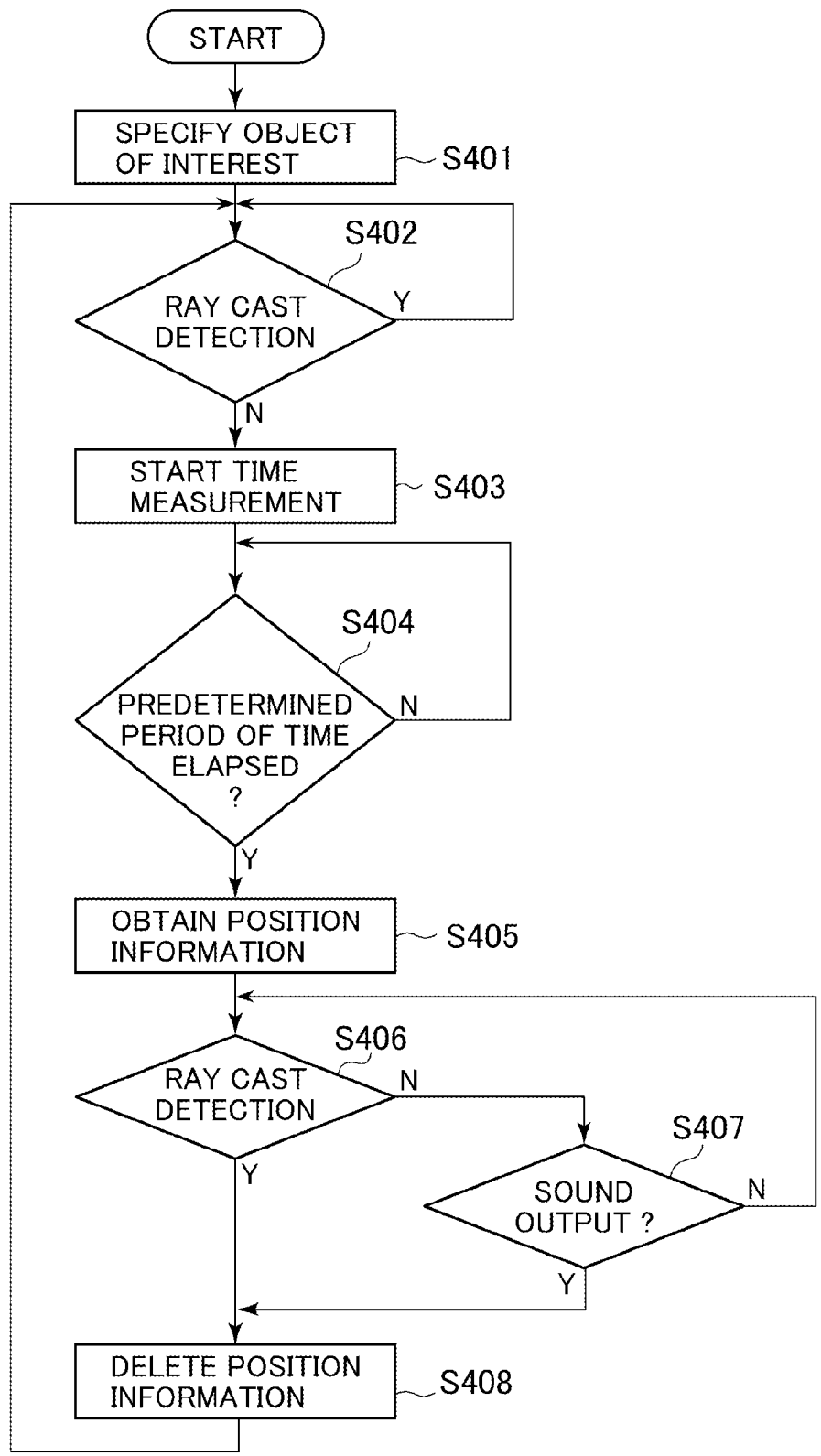
FIG. 17 is a diagram explaining an outline of a flow of processing for controlling a direction in which a part of a non-operating object is directed.

As shown in FIG. 17, the object of interest specifying unit 204 specifies one or more objects of interest for a non-operating object according to a predetermined criterion (S401). Note that when two or more objects of interest are specified, the following processing is executed with respect to each of the objects of interest.

Then, the ray cast detection unit 210 executes ray cast detection between the object of interest and the non-operating object for every predetermined period of time, based on the position information on the object of interest, the non-operating object, and the obstacle (S402).

When the ray cast detection is successful, that is, for example, absence of an obstacle between the object of interest and the non-operating object is determined, as shown in FIG. 16A, for example, the flow returns to S402.

Meanwhile, failed ray cast detection is determined at S403, that is, presence of an obstacle between the object of interest and the non-operating object is determined, as shown in FIG. 16C, for example, the time measuring unit 151 starts time measurement (S403). Thereafter, the time determining unit 152 determines whether or not the period of time measured by the time measuring unit 151 has reached a predetermined period of time (S404), and upon determination that the period of time has reached the predetermined period of time, the holding unit 153 obtains and holds the position information on the object of interest at that time (gazed point information) (S405). For example, supposing that the period of time has reached the predetermined period of time when the object of interest 164 has moved to the gazed point 167 in FIG. 16C, the position information on the gazed point 167 is obtained and held. Meanwhile, upon determination that the period of time has not yet become reached the predetermined period of time, the flow returns to S404. Note that when ray cast detection is completed successful during the period between the start of time measurement at S403 and elapse of a predetermined period of time at S404 (for example, in a case where the wall 163 has only a short length, and a situation in which the object of interest 164 is hidden by the wall 163 when being viewed from the non-operating object 161 does not last for a predetermined period of time), the flow returns to S402.

The ray cast detection unit 210 executes the above described ray cast detection between the non-operating object and the object of interest for every predetermined period of time (S406). Then, upon determination of successful ray cast detection at S406, the flow advances to S408 to be described later.

Meanwhile, upon determination of a failed ray cast detection at S406, the flow advances to S407, where whether or not the object of interest action control unit 403 causes the object of interest to execute predetermined processing, such as, e.g., outputting sound, is determined (S407). Then, upon determination that the object of interest action control unit 403 causes the object of interest to execute processing for outputting sound, the flow advances to S408, to be described later. Meanwhile, upon determination that the object of interest action control unit 403 does not cause the object of interest to execute processing for outputting sound, the flow returns to S406.

When successful ray cast detection is determined at S406 or when it is determined at S407 that the object of interest action control unit 403 causes the object of interest to execute processing for outputting sound, the position information on the object of interest held in the holding unit 153 is deleted (S408). Note that, as described above, when two or more objects of interest are specified for the non-operating object at S401, the processing from S402 to S408 is executed with respect to each of the objects of interest. In this case, correlated gazed point information is held in the holding unit 153, for example, with respect to each identification information item identifying the object of interest.

Below, a flow of processing for controlling a direction in which a part of a structure constituting a non-operating object is directed will be described, mainly referring to the flow of processing by the non-operating object action control unit 402. Note that, similar to the above, for brevity of description, a case shown in FIGS. 16A to 16E will be described as an example.

Figure 18:
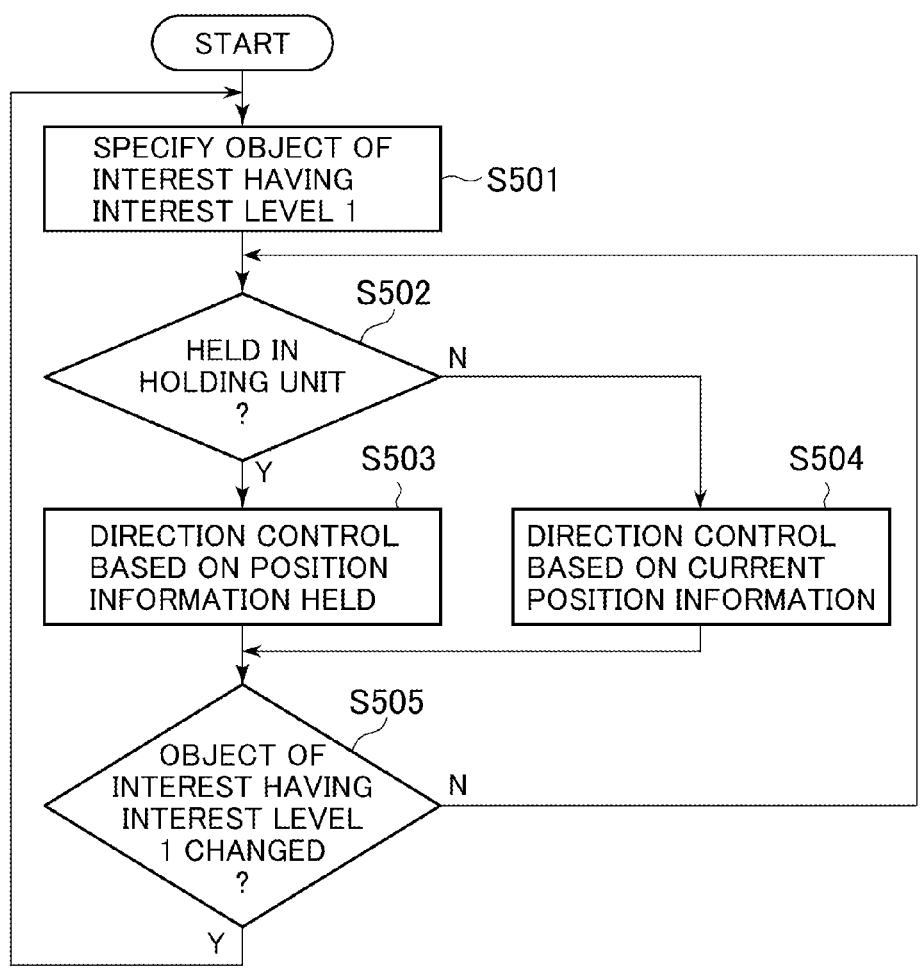
FIG. 18 is a diagram explaining an outline of a flow of processing for controlling a direction in which a part of a non-operating object is directed.

As shown in FIG. 18, an object of interest having the highest interest level (interest level 1) among the objects of interest for the non-operating object is specified, the interest level indicative of the interest priority level for the non-operating object (S501). Then, the non-operating object action control unit 402 determines whether or not the position information on the object of interest having the interest level 1 is held in the holding unit 153 (S502). Upon determination that position information on the object of interest having the interest level 1 is held in the holding unit 153, the position information having the interest level 1, stored in the holding unit 153, is obtained, and the direction in which a part of the structure constituting the non-operating object is directed is controlled, based on the position information (S503). In this case, similar to the above, as shown in FIG. 16E, for example, the non-operating object action control unit 402 controls such that the face or head 162 of the non-operating object 161 is directed toward the gazed point 167. Meanwhile, upon determination that position information on the object of interest having the interest level 1 is not held in the holding unit 153, the current position information on the object of interest having the interest level 1 is obtained from the space DB 202, for example, so that the direction in which a part of the structure constituting the non-operating object is directed is controlled based on the position information (S504). Similar to the above, in this case, as shown in FIGS. 16A, 16D, and 16E, for example, the non-operating object action control unit 402 controls such that the face or head 162 of the non-operating object 161 is directed toward the object of interest 164. Thereafter, the non-operating object action control unit 402 determines whether or not the object of interest having the interest level 1 has changed (S505). Upon determination that the object of interest has not changed, the flow returns to S502. On the other hand, upon determination that the object of interest having the interest level 1 has changed, the flow returns to S501.

With the above described structure, it is possible to provide an object control program, a computer readable storage medium storing an object control program, an object control device, and an object control method capable of controlling such that a part, such as the face or head, of a structure constituting an object is directed to an object of interest in a virtual space, and of expressing a natural movement of the object even when the object of interest has moved to behind a wall or the like.

Further, as the processing (lost processing) shown in FIG. 17 is executed with respect to two or more objects of interest independently of the processing shown in FIG. 18, it is possible, even when the object of interest having the interest level 1 has changed, to execute lost processing also with respect to the object of interest having the interest level 1 after the change. Therefore, even when the interest level is changed and the object of interest having the interest level 1 is accordingly changed, it is possible to control the direction in which a part of the non-operating object is directed, in consideration of the content of the lost processing executed to the object of interest. That is, for example, even when the object of interest having the interest level 1 after the change is hidden by an object when being viewed from the non-operating object, it is possible to have the non-operating object directed toward the object of interest having the interest level 1 after the change. This is particularly useful when the interest level of the object of interest having the interest level 1 after the change is changed due to, e.g., sound output, or the like.

Note that the above described functional structure and flow of processing of the object control device 100 for controlling the direction in which a part, for example, the face or head, of a structure constituting a non-operating object is directed is a mere example, and various modifications are possible. For example, although a case in which ray cast detection is executed at S406 and determination as to sound output or the like is thereafter made at S407 is described in the above, the processing at S406 and S407 may be executed in parallel after the processing at S405, and when the ray cast detection at S406 fails or no sound output processing is executed at S407, the flow may return to parallel processing at S406 and S407.

Although a case in which an object of interest moves is described for brevity of description, referring to FIGS. 16A to 16E, an object of interest and a non-operating object may both move such that the non-operating object moves with a part of the structure constituting itself kept directed to the object of interest. Further, although a case in which a part of the structure constituting a non-operating object is directed toward an object of interest is described as an example, one or more embodiments of the present invention may be applied to a case in which a part of the structure constituting a non-operating object is directed to an operating object. Further, in this case, another non-operating object may be set instead of the operating object so that one or more embodiments of the present invention may be applied to between the non-operating objects.

Although a structure in which a part of a structure constituting a non-operating object is directed to a position indicated by the position information of an object of interest after determination of presence of an obstacle, such as a wall or the like, between the object of interest and the non-operating object, and then kept so until satisfaction of a predetermined condition (such as that the object of interest becomes visible again from the non-operating object, or the like) is described in the above, this is not limiting. Instead, it may be arranged such that an operating unit is provided for obtaining a moving speed and acceleration information on an object of interest, based on the position information or the like on the object of interest immediately before the determination of presence of an obstacle, such as a wall or the like, between the object of interest and the non-operating object, to obtain the current position of the object of interest, based on the moving speed and the acceleration information, so that a part of the structure constituting the non-operating object is directed to that position. Further, in a predetermined case, position information on an object of interest held in the holding unit 153 may be used to obtain position information on destination candidate information for the object of interest.

What is claimed is:

1. An object control device comprising:
an object of interest specifying unit configured to specify an object of interest in a virtual space to obtain position information on the object of interest;
an obstacle determining unit configured to determine whether or not there is an obstacle for an object between the object of interest and the object in the virtual space;
a time measuring unit configured to measure a period of time elapsed after the obstacle determining unit determines that there is the obstacle;
a holding unit configured to hold position information indicating a position of the object of interest when the period of time measured by the time measuring unit reaches a predetermined period of time; and
an object action control unit configured to control a direction of a part of the object, based on the position information obtained by the object of interest specifying unit before the period of time measured reaches the predetermined period of time, and based on the position information on the object of interest held in the holding unit after the period of time measured reaches the predetermined period of time.

2. The object control device according to claim 1, wherein when the obstacle determining unit determines, after elapse of the predetermined period of time, that there is no obstacle, the object action control unit controls the direction of the part of the object, based on position information on the object of interest obtained by the object of interest specifying unit at a time when the obstacle determining unit determines that there is no obstacle.

3. The object control device according to claim 1, wherein when the object of interest executes sound outputting processing after elapse of the predetermined period of time, the object action control unit controls the direction of the part of the object, based on position information on the object of interest obtained by the object of interest specifying unit at a time when the object of interest executes a sound outputting processing.

4. The object control device according to claim 1, wherein the obstacle determining unit determines, based on the position information on the object of interest, position information on the object, and position information on the obstacle.

5. The object control device according to claim 4, wherein when there is the obstacle on a line connecting the object of interest and the object, the obstacle determining unit determines that there is the obstacle.

6. The object control device according to claim 1, wherein the part of the object is a head of the object, and
wherein before elapse of the predetermined period of time, the object action control unit controls the head to direct toward the object of interest.

7. The object control device according to claim 6, wherein after elapse of the predetermined period of time, the object action control unit controls the head to direct toward a direction that is indicated by the position information on the object of interest held in the holding unit.

8. A non-transitory computer readable storage medium storing an object control program for causing a computer to function as:
an object of interest specifying unit configured to specify an object of interest in a virtual space to obtain position information on the object of interest;
an obstacle determining unit configured to determine whether or not there is an obstacle for an object between the object of interest and the object in the virtual space;
a time measuring unit configured to measure a period of time elapsed after the obstacle determining unit determines that there is the obstacle;
a holding unit configured to hold position information indicating a position of the object of interest when the period of time measured by the time measuring unit reaches a predetermined period of time; and
an object action control unit configured to control a direction of a part of the object, based on the position information obtained by the object of interest specifying unit before the period of time measured reaches the predetermined period of time, and based on the position information on the object of interest held in the holding unit after the period of time measured reaches the predetermined period of time.

9. An object control method executed by an object control device having a processor, the method comprising:
specifying, using the processor, an object of interest in a virtual space shown on a display unit to obtain position information on the object of interest;
determining whether or not there is an obstacle for an object between the object of interest and the object in the virtual space shown on the display unit;
measuring, using the processor, a period of time elapsed after determination that there is the obstacle;
holding position information in a non-transitory information storage medium indicating a position of the object of interest when the period of time measured reaches a predetermined period of time; and
controlling a direction of a part of the object, based on the position information obtained before the period of time measured reaches the predetermined period of time, and based on the position information on the object of interest held after the period of time measured reaches the predetermined period of time.

10. An object control device comprising:
an interest object specifying unit configured to specify one or more objects of interest in a virtual space to obtain position information on the one or more objects of interest;
an obstacle determining unit configured to determine whether or not there is an obstacle for an object between the one or more respective objects of interest and the object in the virtual space;
a time measuring unit configured to measure a period of time elapsed after the obstacle determining unit determines that there is the obstacle for the object between the one or more respective objects of interest and the object; and
a holding unit configured to hold position information indicating a position of the object of interest and to delete, in a predetermined case, the position information held therein, when the period of time measured by the time measuring unit reaches a predetermined period of time.

11. The object control device according to claim 10, wherein the predetermined case includes a case in which the obstacle determining unit determines that there is no obstacle for the object between the object of interest and the object after elapse of the predetermined period of time.

12. The object control device according to claim 10, wherein the predetermined case includes a case in which the object of interest executes sound outputting process after elapse of the predetermined period of time.

13. The object control device according to claim 10 further comprising an object action control unit configured to control a direction of a part of the object,
wherein the interest object specifying unit specifies a priority object of interest having highest priority order information among the respective objects of interest, the priority order information being correlated to each of the objects of interest, and
the object action control unit controls the direction of the part of the object, based on current position information on the priority object of interest or position information on the priority object of interest held in the holding unit.

14. The object control device according to claim 13, wherein when the position information on the priority object of interest is held in the holding unit, the object action control unit controls the direction of the part of the object, based on the position information on the priority object of interest held in the holding unit.

15. The object control device according to claim 13, wherein when the position information on the priority object of interest is not held in the holding unit, the object action control unit controls the direction of the part of the object, based on the current position information on the priority object of interest.

16. A non-transitory computer readable storage medium storing an object control program for causing a computer to function as:
an object of interest specifying unit configured to specify one or more objects of interest in a virtual space to obtain position information on the one or more objects of interest;
an obstacle determining unit configured to determine whether or not there is an obstacle for an object between the one or more respective objects of interest and the object in the virtual space;
a time measuring unit configured to measure a period of time elapsed after the obstacle determining unit determines that there is the obstacle for the object between the one or more respective objects of interest and the object; and a holding unit configured to hold position information indicating a position of the object of interest and to delete, in a predetermined case, the position information held therein, when the period of time measured by the time measuring unit reaches a predetermined period of time.

17. An object control method executed by an object control device having a processor, the method comprising:

specifying, using the processor, one or more objects of interest in a virtual space shown on a display unit to obtain position information on the one or more objects of interest;

determining whether or not there is an obstacle for an object between the one or more respective objects of interest and the object in the virtual space shown on the display unit;

measuring, using the processor, a period of time elapsed after determining that there is the obstacle for the object between the one or more respective objects of interest and the object; and holding position information indicating a position of the object of interest and deleting, in a predetermined case, the position information held in a holding unit comprising a non-transitory information storage medium, when the period of time measured reaches a predetermined period of time.

18. An object control device comprising:

an object of interest specifying unit configured to specify an object of interest in a virtual space to obtain position information and identification information on the object of interest;

a destination candidate information storage unit configured to store destination candidate information for obtaining position information on destination candidates that are candidates for a destination for an object to move, wherein the destination candidate information is correlated to the identification information on the object of interest; and a destination information obtaining unit configured to obtain the position information on the destination candidates as to the object of interest and to obtain destination information indicating position information on the designation from the position information on the destination candidates, based on the position information and the identification information obtained on the object of interest and the destination candidate information.

19. The object control device according to claim 18 further comprising a path information specifying unit configured to specify one path information item among a plurality of path information items based on the position information on the object of interest and position information on the plurality of path information items, wherein the destination information obtaining unit obtains the destination information, based on position information indicated by the one path information specified and the position information on the destination candidates.

20. The object control device according to claim 19, wherein the destination information obtaining unit obtains the destination information, based on position information on an obstacle object that forms an obstacle for the object in the virtual space.

21. The object control device according to claim 20, wherein the destination information obtaining unit obtains the destination information, based on position information on a box and the position information on the obstacle object, and wherein the box has a predetermined size and shape and is placed on each of the destination candidates.

22. The object control device according to claim 20, wherein the path information specifying unit determines whether or not the one path information item is available to be specified, based on the position information on the obstacle object, wherein when determining that the one path information item is not available to be specified, the path information specifying unit specifies, as substitute path information, one path information item among the plurality of path information items as substitute path information, based on the position information on the object of interest and position information on the path information, wherein the object control device further includes a substitute point obtaining unit configured to obtain position information on a plurality of substitute points based on position information on the substitute path information, the position information on the object of interest, position information on the object, and the position information on the obstacle object, and wherein the destination information obtaining unit obtains the destination information, based on the position information on the plurality of substitute points.

23. The object control device according to claim 18, wherein the destination candidate information storage unit further stores action identification information identifying an action which the object is caused to perform so as to be correlated to the destination candidate information.

24. The object control device according to claim 23 further comprising:

an arrival determining unit configured to determine whether or not the object arrives at the destination; and an object action control unit configured to cause, when the arrival determining unit determines that the object arrives at the destination, the object to perform an action identified by the action identification information stored correlated to the destination candidate information.

25. The object control device according to claim 18, wherein the destination candidate information includes distance information indicating a distance from a position indicated by the position information on the object of interest and direction information indicating a direction from the position indicated by the position information on the object of interest.

26. The object control device according to claim 25, wherein the destination candidate information includes radius information indicating a radius of a shape defined with a center position obtained based on the distance information and the direction information as a center, angle information indicating a center angle of the shape, and dividing number information for dividing the center angle.

27. A non-transitory computer readable storage medium storing an object control program for causing a computer to function as:

an object of interest specifying unit configured to specify an object of interest in a virtual space to obtain position information and identification information on the object of interest;

a destination candidate information storage unit configured to store destination candidate information for obtaining position information on destination candidates that are candidates for a destination for an object to move, wherein the destination candidate information is correlated to the identification information on the object of interest; and a destination information obtaining unit configured to obtain the position information on the destination candidates as to the object of interest and also destination information indicating position information on the designation from among the position information on the destination candidates, based on the position information and the identification information obtained on the object of interest and the destination candidate information.

28. An object control method executed by an object control device having a processor, the method comprising:
specifying, using the processor, an object of interest in a virtual space shown on a display unit and obtaining position information and identification information on the object of interest; and
obtaining position information on destination candidates as to the object of interest and destination information indicating position information on a destination from among the position information on the destination candidates, based on the position information and the identification information obtained on the object of interest and destination candidate information,
wherein the destination candidate information for obtaining position information on destination candidates that are candidates for a destination for an object to move is stored in a non-transitory information storage medium so as to be correlated in a database to the identification information on the object of interest.

* * * * *